United States Patent
Rusu et al.

(10) Patent No.: US 10,382,739 B1
(45) Date of Patent: *Aug. 13, 2019

(54) VISUAL ANNOTATION USING TAGGING SESSIONS

(71) Applicant: Fyusion, Inc., San Francisco, CA (US)

(72) Inventors: Radu Bogdan Rusu, San Francisco, CA (US); Dave Morrison, San Francisco, CA (US); Keith Martin, San Francisco, CA (US); Stephen David Miller, San Francisco, CA (US); Pantelis Kalogiros, San Francisco, CA (US); Mike Penz, Linz (AT); Martin Markus Hubert Wawro, Dortmund (DE); Bojana Dumeljic, San Mateo, CA (US); Jai Chaudhry, San Francisco, CA (US); Luke Parham, San Francisco, CA (US); Julius Santiago, San Francisco, CA (US); Stefan Johannes Josef Holzer, San Mateo, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/963,896

(22) Filed: Apr. 26, 2018

(51) Int. Cl.
| | |
|---|---|
| G06T 17/00 | (2006.01) |
| G06T 5/00 | (2006.01) |
| G06T 11/60 | (2006.01) |
| H04N 13/183 | (2018.01) |
| H04N 13/207 | (2018.01) |
| G06F 3/0481 | (2013.01) |
| G06F 3/0484 | (2013.01) |
| G06K 9/00 | (2006.01) |

(52) U.S. Cl.
CPC ....... *H04N 13/183* (2018.05); *G06F 3/04815* (2013.01); *G06F 3/04842* (2013.01); *G06K 9/00671* (2013.01); *G06T 5/002* (2013.01); *H04N 13/207* (2018.05)

(58) Field of Classification Search
CPC ............... H04N 13/183; H04N 13/207; G06F 3/04815; G06F 3/04842; G06K 9/00671; G06T 5/002
USPC ......................................... 348/48
See application file for complete search history.

(56) References Cited

U.S. PATENT DOCUMENTS

| | | |
|---|---|---|
| 5,926,190 A | 7/1999 | Turkowski et al. |
| 6,252,974 B1 | 6/2001 | Martens et al. |
| 8,078,004 B2 | 12/2011 | Kang et al. |

(Continued)

*Primary Examiner* — Hee-Yong Kim
(74) *Attorney, Agent, or Firm* — Kwan & Olynick LLP

(57) ABSTRACT

Various embodiments of the present invention relate generally to systems and methods for analyzing and manipulating images and video. In particular, a multi-view interactive digital media representation (MVIDMR) of an object can be generated from live images of an object captured from a camera. After the MVIDMR of the object is generated, a tag can be placed at a location on the object in the MVIDMR. The locations of the tag in the frames of the MVIDMR can vary from frame to frame as the view of the object changes. When the tag is selected, media content can be output which shows details of the object at location where the tag is placed. In one embodiment, the object can be car and tags can be used to link to media content showing details of the car at the locations where the tags are placed.

25 Claims, 24 Drawing Sheets

(56) References Cited

U.S. PATENT DOCUMENTS

| | | |
|---|---|---|
| 2002/0094125 A1 | 7/2002 | Guo |
| 2006/0188147 A1 | 8/2006 | Rai et al. |
| 2008/0106593 A1 | 5/2008 | Arfvidsson et al. |
| 2008/0152258 A1 | 6/2008 | Tulkki |
| 2008/0201734 A1 | 8/2008 | Lyon et al. |
| 2008/0225132 A1 | 9/2008 | Inaguma |
| 2008/0246759 A1 | 10/2008 | Summers |
| 2009/0263045 A1 | 10/2009 | Szeliski et al. |
| 2009/0303343 A1 | 12/2009 | Drimbarean et al. |
| 2010/0033553 A1 | 2/2010 | Levy |
| 2010/0171691 A1 | 7/2010 | Cook et al. |
| 2011/0254835 A1 | 10/2011 | Segal |
| 2011/0261050 A1 | 10/2011 | Smolic et al. |
| 2012/0019557 A1 | 1/2012 | Aronsson et al. |
| 2012/0147224 A1 | 6/2012 | Takayama |
| 2013/0155180 A1 | 6/2013 | Wantland et al. |
| 2013/0162634 A1 | 6/2013 | Baik |
| 2013/0250045 A1 | 9/2013 | Ki et al. |
| 2014/0087877 A1 | 3/2014 | Krishnan |
| 2014/0253436 A1 | 9/2014 | Petersen |
| 2014/0307045 A1 | 10/2014 | Richardt et al. |
| 2015/0130799 A1* | 5/2015 | Holzer .................. G06F 16/532 345/420 |
| 2015/0130800 A1 | 5/2015 | Holzer et al. |
| 2015/0130894 A1 | 5/2015 | Holzer et al. |
| 2015/0134651 A1 | 5/2015 | Holzer et al. |
| 2015/0138190 A1 | 5/2015 | Holzer et al. |
| 2015/0339846 A1 | 11/2015 | Holzer et al. |
| 2017/0018054 A1 | 1/2017 | Holzer et al. |
| 2017/0018055 A1 | 1/2017 | Holzer et al. |
| 2017/0018056 A1 | 1/2017 | Holzer et al. |
| 2017/0084001 A1 | 3/2017 | Holzer et al. |

\* cited by examiner

VISUAL ANNOTATION USING TAGGING SESSIONS

TECHNICAL FIELD

The present disclosure relates generally to the capture and presentation of image sequences, and more specifically to capturing and generating content for multi-view interactive digital media representations (MVIDMR) for augmented reality and virtual reality systems.

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Producing combined images, such as a panorama, or a three-dimensional (3D) image or model requires combining data from multiple images and can require interpolation or extrapolation of data. Most previously existing methods of interpolation or extrapolation require a significant amount of data in addition to the available image data. For those approaches, the additional data needs to describe the scene structure in a dense way, such as provided by a dense depth map (where for every pixel a depth value is stored) or an optical flow map (which stores for every pixel the motion vector between the available images). Other existing methods of producing 3D models may be done by computer generation of polygons or texture mapping over a three-dimensional mesh and/or polygon models, which also require high processing times and resources. This limits the efficiency of these methods in processing speed as well as transfer rates when sending it over a network. Accordingly, improved mechanisms for extrapolating and presenting 3D image data are desirable.

Overview

Various embodiments of the present invention relate generally to systems and methods for analyzing and manipulating images and video. According to particular embodiments, the spatial relationship between multiple images and video is analyzed together with location information data, for purposes of creating a representation referred to herein as a multi-view interactive digital media representation (MVIDMR). The MVIDMR can be output to a device with a display, such as a mobile device, tablet computer or laptop computer.

MVIDMRs can include image frames of an object from many different viewing angles. As an example, image frames with viewing angles about a common axis can be grouped together. The grouped images can be stabilized and smoothed. These images can be provided in a sequence where the viewing angle changes from image to image in the sequence in an orderly manner. Thus, as the sequence of images is viewed on a display, the object can appear to rotate about the common axis.

In various embodiments, a location on an object appearing in a frame of an MVIDMR can be tagged. The tag can be integrated into the MVIDMR. The location where a tag is placed can appear in all or a portion of frames of the MVIDMR. Thus, a tag may appear in all or a portion of the frames of the MVIDMR.

In particular embodiments, media content, such as photo, a video or an MVIDMR, can be generated that is associated with the location where the tag is placed. The media content can provide details about the location where a tag is placed, such as the close up views. The tag can be selectable. Thus, when the MVIDMR is output and the tag is selected, the media content associated with the tag can be output. As is described in more detail as follows, methods and apparatus, including interfaces, for generating an MVIDMR, placing tags and propagating the tag through the frames of the generated MVIDMR and capturing the media content, which can be output, when the tag is selected, are discussed.

One aspect of the disclosure is associated with a method on a mobile device. The mobile device can include a processor, a memory, a camera, a plurality of sensors, a microphone and a display and a touch screen sensor. The method can be generally characterized as 1) receiving, via an input interface on the mobile device, a request to generate a multi-view interactive digital media representation (MVIDMR) of an object; 2) recording a first plurality of frames from the camera on the mobile device from a live video stream as the mobile device moves along a trajectory such that different views of the object are captured in the first plurality of frames; 3) generating the MVIDMR of the object including a second plurality of frames from the first plurality of frames where the different views of the object are included in each of the second plurality of frames; 4) outputting a first frame from the MVIDMR including a selector rendered over the first frame to the display; 5) receiving, via the touch screen sensor and the selector, a selection of a location on the object in the first frame; 6) removing the selector from the first frame and rendering a first selectable tag at the location selected in the first frame; 7) outputting the first frame including the first selectable tag to the display; 8) for each remaining frame in the second plurality of frames of the MVIDMR, determining a first location where the location on the object appears in the each remaining frame including determining whether the location on the object appears in the each remaining frame; 9) for each remaining frame where the location on the object appears, rendering the first selectable tag into each remaining frame at the first location to generate a third plurality of frames for a tagged MVIDMR; 10) outputting to the display the tagged MVIDMR; 11) receiving media content associated with the first selectable tag; 12) outputting a first frame from the third plurality of frames of the tagged MVIDMR that includes the first selectable tag; 13) receiving input from the touch screen sensor indicating the first selectable tag is selected in the first frame from the tagged MVIDMR; and 14) in response outputting the media content associated with the first selectable tag to the display. In particular embodiments, prior to recording first plurality of frames including the object, an input indicating a selection of the object can be received. Further, Image stabilization and smoothing can be applied to the first plurality of frames to generate the second plurality of frames.

In particular embodiments, the method can further comprise outputting to the display the third plurality of frames associated with the tagged MVIDMR where the object appears in each of the third plurality of frames and where the first selectable tag appears in only portion of the third plurality of frames. In an addition embodiment, the method can further comprise generating a prompt to save the tagged MVIDMR. In response to receiving a selection of the prompt, the tagged MVIDMR can be saved.

In yet other embodiments, the method can further comprise: 1) generating a prompt to move a current location of the first selectable tag, 2) receiving an input to move the current location of the first selectable tag to a new location on the object, 3) outputting a second frame including the first selectable tag at the new location on the object to the display, 4) for each remaining frame in the second plurality of frames of the MVIDMR, determining a second location where the new location on the object appears in the each remaining frame including determining whether the new location on the object appears in the each remaining frame; and 5) for each remaining frame where the new location on the object appears, rendering the first selectable tag into each remaining frame at the second location to generate a fourth plurality of frames for a second tagged MVIDMR.

In another embodiment, the method can further comprise, based upon the first location where the first selectable tag is rendered in each of the third plurality of frames of the tagged MVIDMR where the first selectable tag appears and based upon an area of the first selectable tag, determining a mapping between the first selectable tag and the touch screen sensor. The mapping can be used to determine whether an input on the touch screen sensor indicates a selection of the first selectable tag. In response, to the selection of the first selectable tag, the media content associated with the first selectable tag can be output to the display.

In a particular embodiment, the method can further comprise 1) outputting a first frame from the third plurality of frames of the tagged MVIDMR including the selector rendered over the first frame to the display; 2) receiving, via the touch screen sensor and the selector, a selection of a second location on the object in the first frame; 3) removing the selector and rendering a second selectable tag at the second location selected in the first frame of the tagged MVIDMR; 4) outputting the first frame including the second selectable tag from the tagged MVIDMR to the display; 5) for each remaining frame in the third plurality of frames of the tagged MVIDMR, determining a third location where the second location on the object appears in the each remaining frame including determining whether the second location on the object appears in the each remaining frame; 6) for each remaining frame where the second location on the object appears, rendering the second selectable tag into each remaining frame at the third location to generate a fourth plurality of frames for a second tagged MVIDMR; and 7) outputting the second tagged MVIDMR, including the first selectable tag and the second selectable tag, to the display.

In the example of the previous paragraph, the first selectable tag and the second selectable tag can both appear in a portion of the fourth plurality of frames of the second tagged MVIDMR. In some instances, only the first selectable tag appears in a first portion of the fourth plurality of frames of the second tagged MVIDMR and only the second selectable tag appears in a second portion of the fourth plurality of frames of the second tagged MVIDMR. In yet other instances, neither the first selectable tag nor the second selectable tag appear in a portion of the fourth plurality of frames of the second tagged MVIDMR. Further, the method can comprise, 1) receiving second media content associated with the second selectable tag; 2) outputting a first frame from the fourth plurality of frames of the second tagged MVIDMR that includes the second selectable tag; 3) receiving input from the touch screen sensor indicating the second selectable tag is selected in the first frame; and in response, 4) outputting the second media content associated with the second selectable tag to the display.

In other embodiments, the media content can show one or more close-up views of the location on the object. Further, the media content can be one of a photo showing a close-up view of the location on the object or a second MVIDMR showing close-up views of the location on the object. In addition, the method can further comprise generating a prompt to capture the media content associated with the first selectable tag.

In a particular embodiment, the object can be a car. Therefore, the first selectable tag can be associated with a damaged location on the car and the media content shows one or more close-up views of the damaged location. Alternatively, the first selectable tag can be associated with a component or a region of the car where the media content shows one or more close-up views of the component or the region of the car.

In another embodiment, the object can include an exterior and an interior. The tagged MVIDMR can show the exterior of the object. The method can further comprise generating a second tagged MVIDMR of the interior of the object, wherein the tagged MVIDMR includes a second selectable tag that, when selected, causes the second tagged MVIDMR of the interior of the object to be output to the display. The second tagged MVIDMR of the interior of the object can include a third selectable tag that when selected causes first media content showing one or more close up views of an interior location to be output to the display.

In yet another embodiment, the method can further comprise 1) generating a plan view of the object, 2) determining where the location on the object associated with the first selectable tag is located on the plan view, 3) rendering a second selectable tag corresponding to the first selectable tag onto the plan view and 4) outputting the plan view including the second selectable tag onto to the display. In one instance, the method can also comprise receiving a selection of the second selectable tag on the plan view, outputting to the display the media content associated with the first selectable tag. In another instance, the method can also comprise receiving a selection of the second selectable tag on the plan view, outputting to the display a second frame selected from among the third plurality of frames of the tagged MVIDMR which includes the first selectable tag.

In yet further embodiments, the location selected on the object can be a component of the object and the method can further comprise 1) determining a plurality of key points associated with the component and 2) tracking the key points in each of the remaining frames of the second plurality of frames to determine the first location in each of the remaining frames where the location on the object appears. In addition, the method can further comprise outputting to the display a textual description of the location on the object in the first frame that is to be selected and tagged to guide a user through a tagging process.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
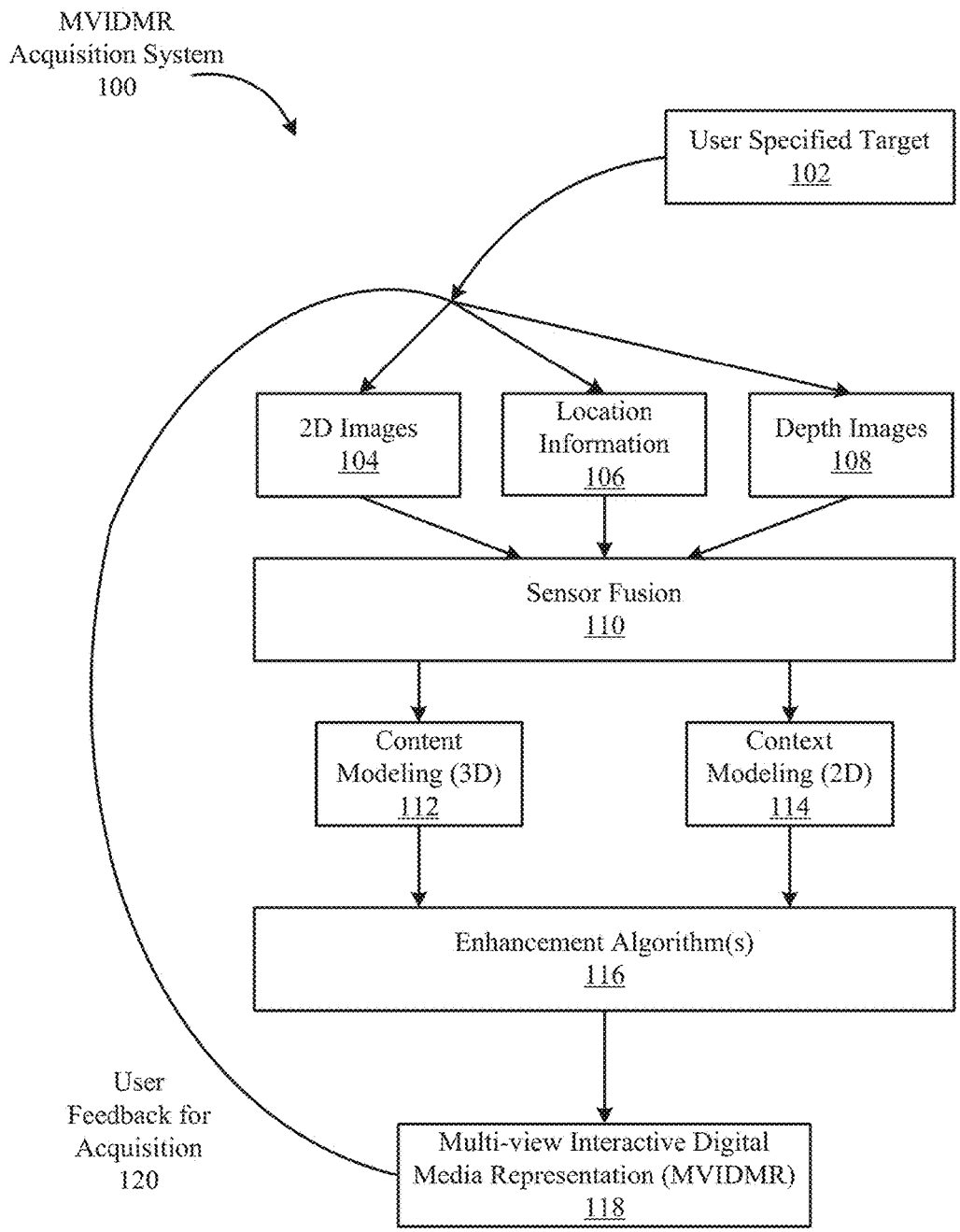
FIG. 1 illustrates an example of a multi-view interactive digital media representation acquisition system in accordance with embodiments of the present invention.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

Various aspects of the present invention relate generally to systems and methods for analyzing the spatial relationship between multiple images and video together with location information data, for the purpose of creating a single representation, a multi-view interactive digital media representation (MVIDMR), which eliminates redundancy in the data, and presents a user with an interactive and immersive active viewing experience. According to various embodiments, active is described in the context of providing a user with the ability to control the viewpoint of the visual information displayed on a screen.

Next, with respect to FIGS. 1-12 methods and apparatus for acquiring image data and generating a multi-view interactive digital media representation (MVIDMR) of an object are discussed. In particular embodiments, the MVIDMRs can be generated from a video stream of an object captured using a mobile device. The video stream can include a plurality of frames each having image data. Method and apparatus embodied as interfaces are described.

The interfaces can allow tags to be placed in the MVIDMR and media content associated with the tags to be captured. The tags can be selectable to allow the captured media content to be output. In embodiment, the object in the MVIDMR can be a car and the tags can be used to output media content with additional details about the car at the location where the tag is placed on the car. For example, a tag placed on a wheel on the car in an MVIDMR can be selected to output additional media content about the wheel.

A number of sections are described in the detailed description. In a first section, including FIGS. 1 to 6D and entitled "MVIDMR Generation," some aspects of image capture and MVIDMR generation are discussed. In more detail, an example of MVIDMR system is discussed with respect to FIG. 1. An example of a process flow for generating an MVIDMR is described. With respect to FIG. 3, one example of multiple camera views that can be fused into a three-dimensional (3D) model to create an immersive experience is discussed. With respect to FIG. 4, one example of separating content and context for MVIDMR generation is described. Examples of concave view and convex views, respectively, where both views use a back-camera capture style are described with respect to FIGS. 5A and 5B. Various capture modes, which can be used in MVIDMR generation, are discussed with respect to FIGS. 6A to 6D.

Figure 7:
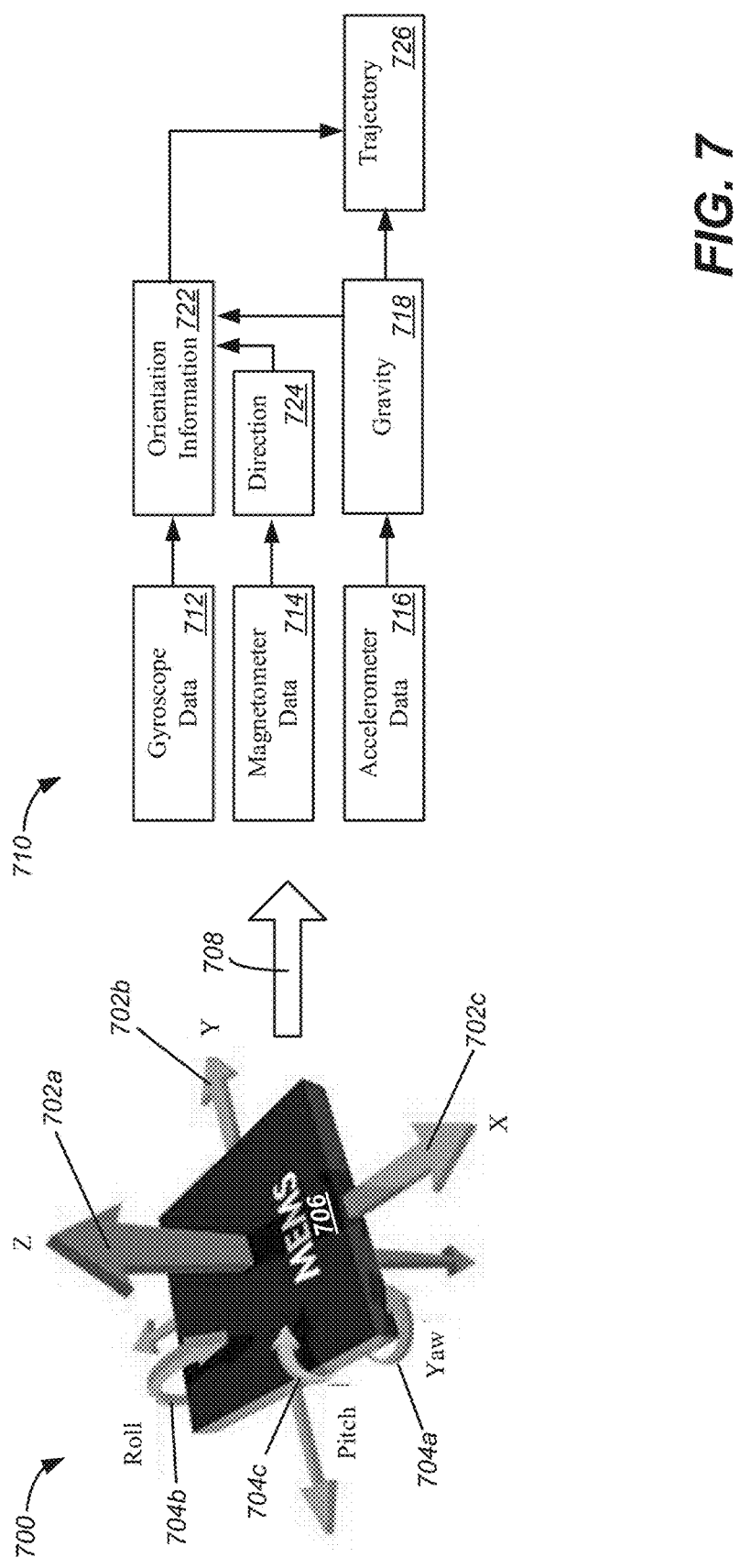
FIG. 7 illustrates a sensor package for determining orientation of a camera used to generate a MVIDMR in accordance with embodiments of the present invention.
Figure 8B:
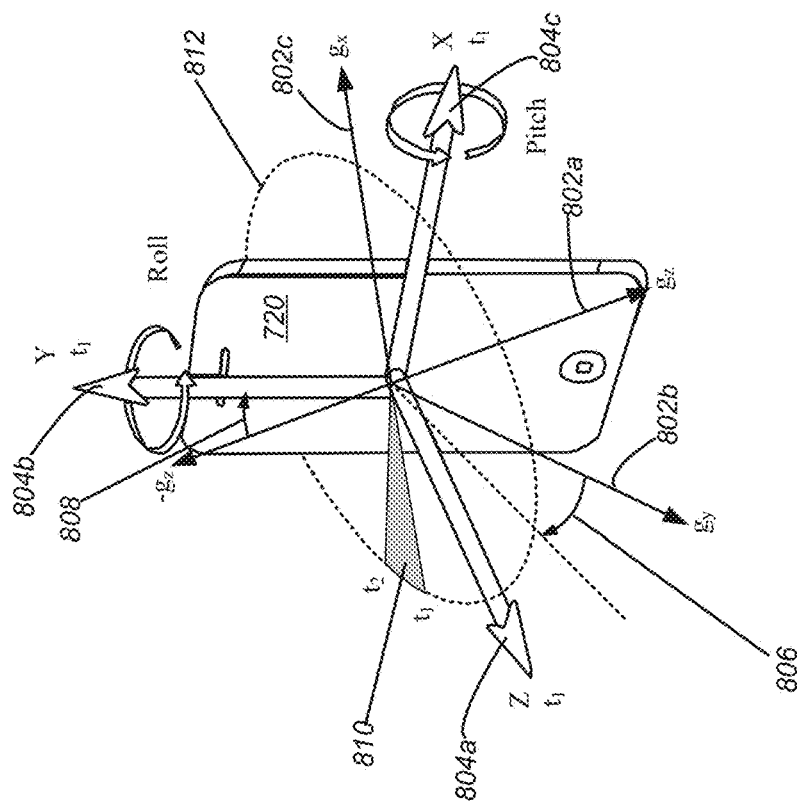
FIG. 8B illustrates pitch and roll of a mobile device and angle changes as a function of time relative to the gravity vector during MVIDMR generation in accordance with embodiments of the present invention.
Figure 8A:
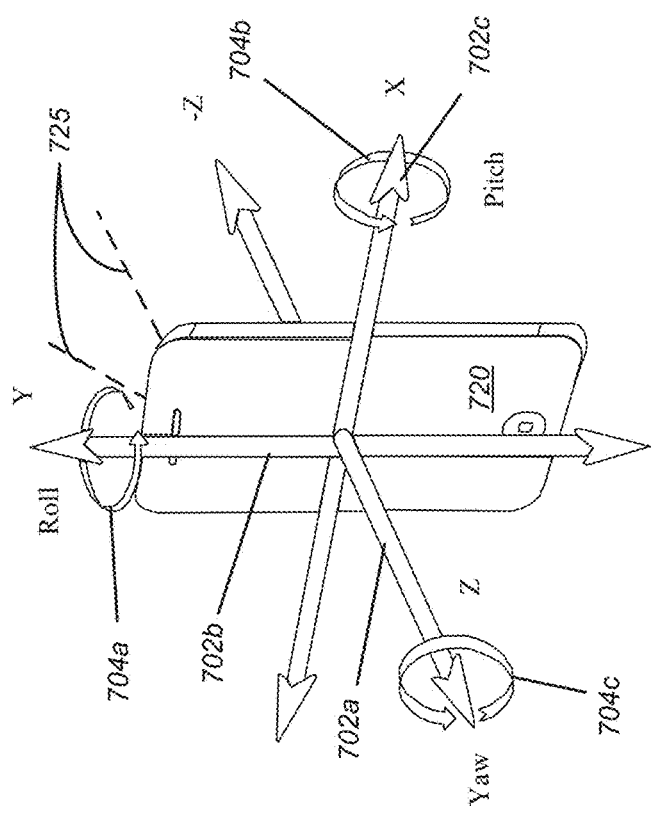
FIG. 8A illustrates a mobile device and body-centric coordinate system in accordance with embodiments of the present invention.

In a second section, including FIGS. 7, 8A and 8B, and entitled "IMU Data and Processing," sensor packages are described. In particular, with respect to FIG. 7, some examples of sensor packages, their integration into a mobile device and sensors are discussed. The sensor data from the sensor packages can be used in the MVIDMR generation process. With respect to FIGS. 8A to 8B, rotation metrics and angle measurements determined from IMU data are described. The rotation data and angle measurements can be used to determine a ground plane of the camera and a viewing angle of the object which is captured in the images.

In a third section, including FIGS. 9A-12, and entitled "Session Tagging," methods and apparatus for generating an MVIDMR of an object, placing tags on the object in the MVIDMR and capturing media content associated with the tags are described. In particular, with respect to FIGS. 9A-9K, screen grabs of an interface which performs these functions is discussed. With respect to FIG. 10A, tags placed on an object in the MVIDMR and projected onto a plan view of the object are described. With respect to 10B, an MVIDMR navigation scheme is described where tags displayed on a plan view of an object are used to navigate with an MVIDMR of the object including the tags. With respect to FIG. 11, a method of generating an MVIDMR of an object, placing tags on the object in the MVIDMR and then capturing media content associated with the tags is described. Finally, systems which can be used to perform the initial processing and additional processing are described with respect to FIG. 12.

MVIDMR Generation

With reference to FIG. 1, shown is one example of a multi-view interactive digital media representation acquisition system 100. In the present example embodiment, the multi-view interactive digital media representation acquisition system 100 is depicted in a flow sequence that can be used to generate a multi-view interactive digital media representation. According to various embodiments, the data used to generate a multi-view interactive digital media representation can come from a variety of sources.

In particular, data such as, but not limited to two-dimensional (2D) images 104 can be used to generate a multi-view interactive digital media representation. Images can also be referred to as frames, video frames or image frames. These 2D images can include color image data streams such as multiple image sequences, video data, etc., or multiple images in any of various formats for images, depending on the application. Another source of data that can be used to generate a multi-view interactive digital media representation includes environment information 106. This environment information 106 can be obtained from sources such as accelerometers, gyroscopes, magnetometers, GPS, WiFi, IMU-like systems (Inertial Measurement Unit systems), and the like. Some methods of utilizing the IMU to generate a multi-view interactive digital media representation are described in more detail below with respect to FIGS. 7, 8A and 8B. Yet another source of data that can be used to generate a multi-view interactive digital media representation can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a multi-view interactive digital media representation can be generated for a combination of data that includes both 2D images 104 and environment information 106, without any depth images 108 provided. In other embodiments, depth images 108 and environment information 106 can be used together at sensor fusion block 110. Various combinations of image data can be used with environment information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of a multi-view interactive digital media representation are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It is noted, however, that a multi-view interactive digital media representation can be generated without a user specified target in some applications.

In the present example embodiment, one or more enhancement algorithms can be applied at enhancement algorithm(s) block 116. In particular example embodiments, various algorithms can be employed during capture of multi-view interactive digital media representation data, regardless of the type of capture mode employed. These algorithms can be used to enhance the user experience. For instance, automatic frame selection, stabilization, view interpolation, filters, and/or compression can be used during capture of multi-view interactive digital media representation data. In some examples, these enhancement algorithms can be applied to image data after acquisition of the data. In other examples, these enhancement algorithms can be applied to image data during capture of multi-view interactive digital media representation data.

According to particular example embodiments, automatic frame selection can be used to create a more enjoyable multi-view interactive digital media representation. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a multi-view interactive digital media representation in a manner similar to that used for video. In particular, key frames in a multi-view interactive digital media representation can be stabilized for to produce improvements such as smoother transitions, improved/enhanced focus on the content, etc. However, unlike video, there are many additional sources of stabilization for a multi-view interactive digital media representation, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a multi-view interactive digital media representation. Because points of interest in a multi-view interactive digital media representation are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for multi-view interactive digital media representations. For instance, key points can be detected and tracked. Key point tracking can be a subset of feature tracking. Key points can be tracked from one video frame to the next. For example, key point tracking can be performed by estimating a translation of the key point using an optical flow, such as via the Lucas-Kanade method. Optical flow can be the apparent motion of brightness patterns in the image. Based upon information obtained from an image analysis technique, key points appearing in a first frame can be matched to key points appearing in a second frame and so on.

In certain scenes, such as a dynamic scene or static scene with parallax, no simple warp may exist that can stabilize everything. Consequently, there is a trade-off in which certain aspects of the scene receive more attention to stabilization and other aspects of the scene receive less attention. Because a multi-view interactive digital media representation is often focused on a particular object of interest, a multi-view interactive digital media representation can be content-weighted so that the object of interest is maximally stabilized in some examples.

Another way to improve stabilization in a multi-view interactive digital media representation includes direct selection of a region of a screen. For instance, if a user taps to focus on a region of a screen, then records a convex multi-view interactive digital media representation, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic key points. In another example, a user can select an area of image to use as a source for key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of a multi-view interactive digital media representation in some embodiments. In other embodiments, view interpolation can be applied during multi-view interactive digital media representation generation.

In some examples, filters can also be used during capture or generation of a multi-view interactive digital media representation to enhance the viewing experience. Just as many popular photo sharing services provide aesthetic filters that can be applied to static, two-dimensional images, aesthetic filters can similarly be applied to surround images. However, because a multi-view interactive digital media representation is more expressive than a two-dimensional image, and three-dimensional information is available in a multi-view interactive digital media representation, these filters can be extended to include effects that are ill-defined in two dimensional photos. For instance, in a multi-view interactive digital media representation, motion blur can be added to the background (i.e. context) while the content remains crisp. In another example, a drop-shadow can be added to the object of interest in a multi-view interactive digital media representation.

In various examples, compression can also be used as an enhancement algorithm 116. In particular, compression can be used to enhance user-experience by reducing data upload and download costs. Because multi-view interactive digital media representations use spatial information, far less data can be sent for a multi-view interactive digital media representation than a typical video, while maintaining desired qualities of the multi-view interactive digital media representation. Specifically, the IMU, key point tracks, and user input, combined with the view interpolation described above, can all reduce the amount of data that must be transferred to and from a device during upload or download of a multi-view interactive digital media representation. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a multi-view interactive digital media representation 118 is generated after any enhancement algorithms are applied. The multi-view interactive digital media representation can provide a multi-view interactive digital media representation. In various examples, the multi-view interactive digital media representation can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, multi-view interactive digital media representations provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with multi-view interactive digital media representations that allow the multi-view interactive digital media representations to be indexed with a high degree of efficiency and accuracy; and the ability of the user to interact and change the viewpoint of the multi-view interactive digital media representation. In particular example embodiments, the characteristics described above can be incorporated natively in the multi-view interactive digital media representation, and provide the capability for use in various applications. For instance, multi-view interactive digital media representations can be used to enhance various fields such as e-commerce, visual search, 3D printing, file sharing, user interaction, and entertainment.

In some embodiments, a multi-view interactive digital media representation can use a series of 2-D images of a physical object taken from multiple viewpoints. When the 2-D images are output to a display, the physical object can appear to undergo a 3-D transformation, such as a rotation in 3-D space. This embodiment of the multi-view interactive digital media representation approach differs from using a full 3-D model of the physical object.

With a full 3-D model approach, the physical object can be represented as a series of polygons where the polygons are defined by points in a 3-D model space. After the 3-D model of the physical object is generated, the 3-D model can be initially positioned in the 3-D model space. Then, the position of the 3-D model can be adjusted in 3-D model space as function of time. For example, the 3-D model of the physical object can be rotated in the 3-D model space.

The re-positioning of the 3-D model involves determining a new location of each of the points of the 3-D model in the 3-D model space. Next, textures can be reapplied to the 3-D model. Yet further, a background can be added to the 3-D model space. Then, a light source in the 3-D model space can be simulated. Finally, based upon the light source, the 3-D model and the background can be re-rendered to a 2-D image. This process is repeated each time the 3-D model is changed in the 3-D model space.

The determination of the changes to the 3-D model positions in the 3-D space as a function of time, the re-texturing of the model, the addition of the background and then the re-rendering is computationally expensive, especially as the complexity of the 3-D model increases. Further, as described above, it requires the generation and storage of a 3-D model and its defining parameters, which is time consuming. Thus, the multi-view interactive digital media representation can be more computationally efficient and require less memory resources than a 3-D model approach.

In addition, when an apparent motion of an object is output from a multi-view interactive digital media representation, it appears as if the object motion is generated from an image quality 3-D textured model. Image quality 3-D textured models are generated in a time consuming and often manual process. In particular, the generation of an image quality textured 3-D model of an object, such as an actual person's face, is notoriously difficult and time consuming, especially, when a "life like" rendering of the object is desired.

In this embodiment of the multi-view interactive digital media representation approach, because of the elimination of the 3-D modeling steps, user-selected objects from user generated 2-D images can be converted quickly to a multi-view interactive digital media representation and then output to a display in real-time. During output, the user can control aspects of apparent motion of the object within the multi-view interactive digital media representation. Because the object in the multi-view interactive digital media representation can be generated from real images, such as images received from a user-controlled camera, the object appears life-like when output. In a traditional 3-D modeling approach, because of the difficulties associated with generating an image quality 3-D model, this capability is not offered.

Returning to FIG. 1, according to various example embodiments, once a multi-view interactive digital media representation 118 is generated, user feedback for acquisition 120 of additional image data can be provided. In particular, if a multi-view interactive digital media representation is determined to need additional views to provide a more accurate model of the content or context, a user may be prompted to provide additional views. Once these additional views are received by the multi-view interactive digital media representation acquisition system 100, these additional views can be processed by the system 100 and incorporated into the multi-view interactive digital media representation.

Figure 2:
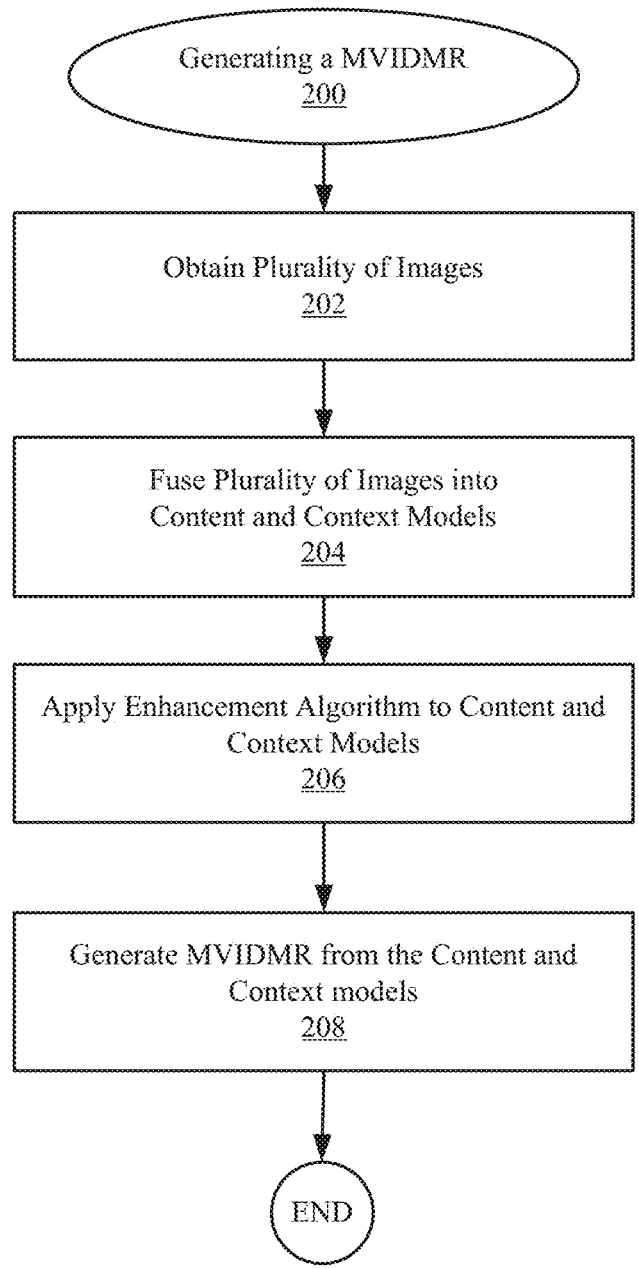
FIG. 2 illustrates an example of a process flow for generating a multi-view interactive digital media representation in accordance with embodiments of the present invention.

With reference to FIG. 2, shown is an example of a process flow diagram for generating a multi-view interactive digital media representation 200. In the present example, a plurality of images is obtained at 202. According to various embodiments, the plurality of images can include two-dimensional (2D) images or data streams. These 2D images can include location information that can be used to generate a multi-view interactive digital media representation. In some embodiments, the plurality of images can include depth images 108, as also described above with regard to FIG. 1. The depth images can also include location information in various examples.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, filters, and/or compression can be used. In some examples, these enhancement algorithms can be applied to image data during capture of the images. In other examples, these enhancement algorithms can be applied to image data after acquisition of the data.

In the present embodiment, a multi-view interactive digital media representation is generated from the content and context models at 208. The multi-view interactive digital media representation can provide a multi-view interactive digital media representation. In various examples, the multi-view interactive digital media representation can include a three-dimensional model of the content and a two-dimensional model of the context. According to various embodiments, depending on the mode of capture and the viewpoints of the images, the multi-view interactive digital media representation model can include certain characteristics. For instance, some examples of different styles of multi-view interactive digital media representations include a locally concave multi-view interactive digital media representation, a locally convex multi-view interactive digital media representation, and a locally flat multi-view interactive digital media representation. However, it is noted that multi-view interactive digital media representations can include combinations of views and characteristics, depending on the application.

Figure 3:
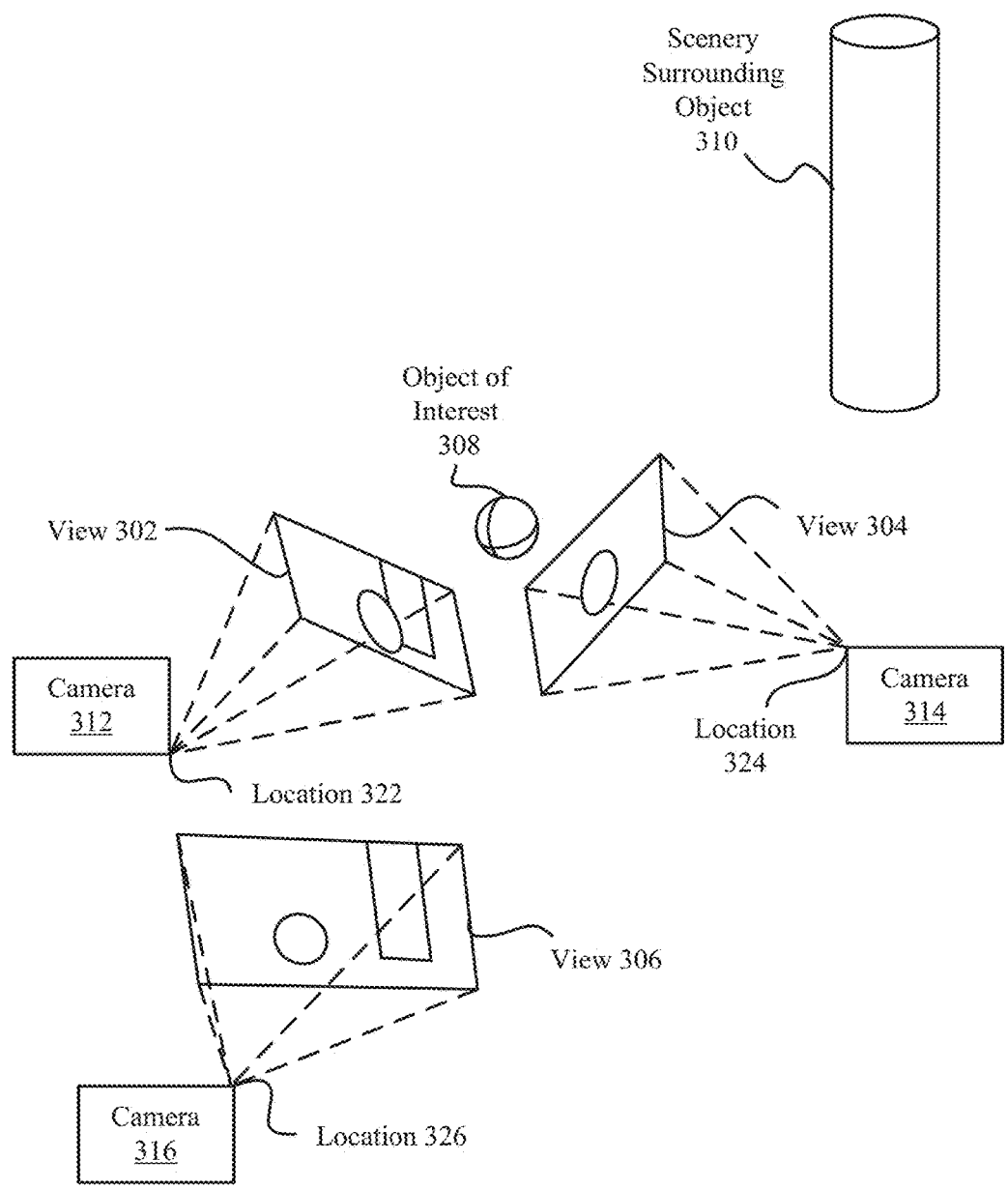
FIG. 3 illustrates one example of multiple camera views that can be fused into a three-dimensional (3D) model to create an immersive experience in accordance with embodiments of the present invention.

With reference to FIG. 3, shown is one example of multiple camera views that can be fused together into a three-dimensional (3D) model to create an immersive experience. According to various embodiments, multiple images can be captured from various viewpoints and fused together to provide a multi-view interactive digital media representation. In the present example embodiment, three cameras 312, 314, and 316 are positioned at locations 322, 324, and 326, respectively, in proximity to an object of interest 308. Scenery can surround the object of interest 308 such as object 310. Views 302, 304, and 306 from their respective cameras 312, 314, and 316 include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various views 302, 304, and 306 along with their associated locations 322, 324, and 326, respectively, provide a rich source of information about object of interest 308 and the surrounding context that can be used to produce a multi-view interactive digital media representation. For instance, when analyzed together, the various views 302, 304, and 326 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing a multi-view interactive digital media representation.

Figure 4:
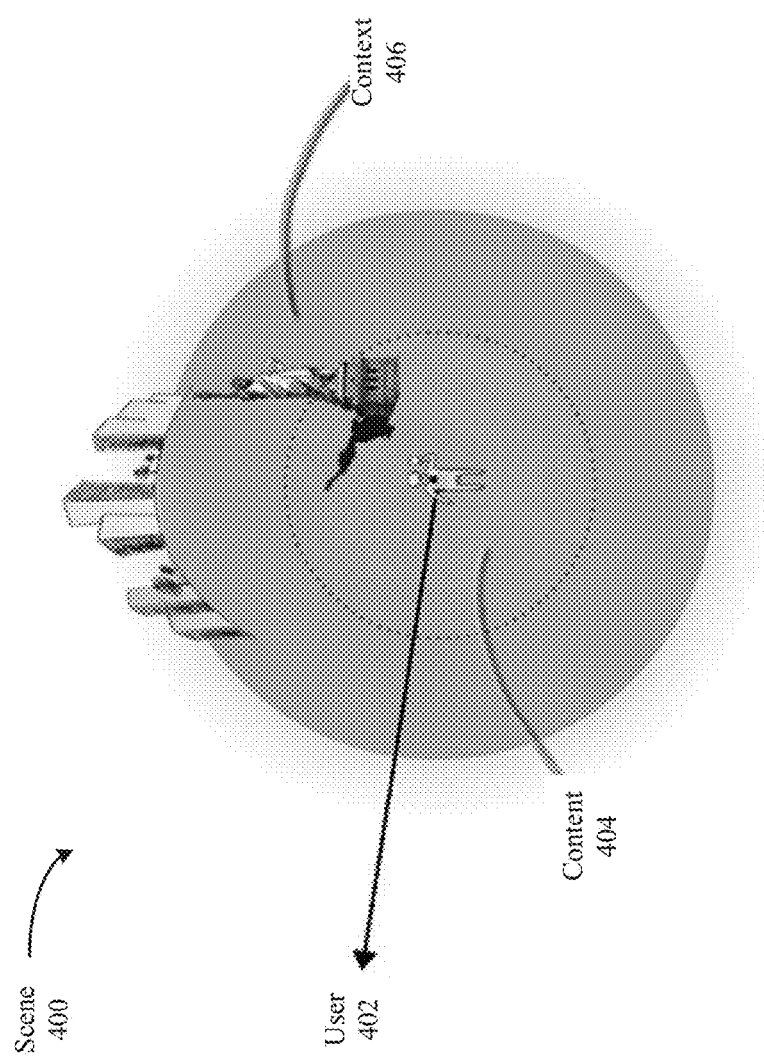
FIG. 4 illustrates one example of separation of content and context in a multi-view interactive digital media representation in accordance with embodiments of the present invention.

FIG. 4 illustrates one example of separation of content and context in a multi-view interactive digital media representation. According to various embodiments of the present invention, a multi-view interactive digital media representation is a multi-view interactive digital media representation of a scene 400. With reference to FIG. 4, shown is a user 402 located in a scene 400. The user 402 is capturing images of an object of interest, such as a statue. The images captured by the user constitute digital visual data that can be used to generate a multi-view interactive digital media representation.

According to various embodiments of the present disclosure, the digital visual data included in a multi-view interactive digital media representation can be, semantically and/or practically, separated into content 404 and context 406. According to particular embodiments, content 404 can include the object(s), person(s), or scene(s) of interest while the context 406 represents the remaining elements of the scene surrounding the content 404. In some examples, a multi-view interactive digital media representation may represent the content 404 as three-dimensional data, and the context 406 as a two-dimensional panoramic background. In other examples, a multi-view interactive digital media representation may represent both the content 404 and context 406 as two-dimensional panoramic scenes. In yet other examples, content 404 and context 406 may include three-dimensional components or aspects. In particular embodiments, the way that the multi-view interactive digital media representation depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the multi-view interactive digital media representation produced may have some characteristics that are similar to other types of digital media such as panoramas. However, according to various embodiments, multi-view interactive digital media representations include additional features that distinguish them from these existing types of digital media. For instance, a multi-view interactive digital media representation can represent moving data. Additionally, a multi-view interactive digital media representation is not limited to a specific cylindrical, spherical or translational movement. Various motions can be used to capture image data with a camera or other capture device. Furthermore, unlike a stitched panorama, a multi-view interactive digital media representation can display different sides of the same object.

Figures 5A, 5B:
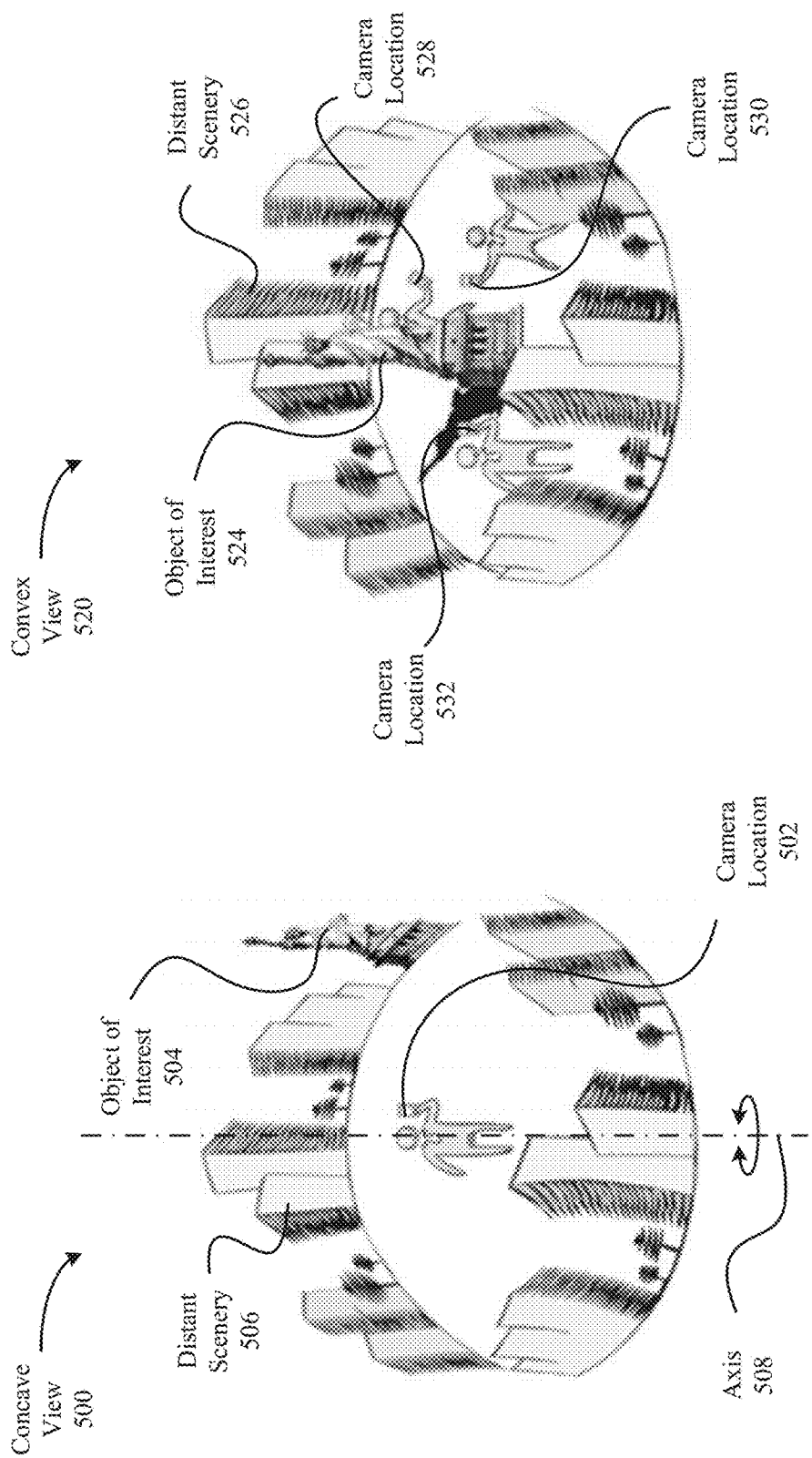
FIGS. 5A and 5B illustrate examples of concave view and convex views, respectively, where both views use a back-camera capture style in accordance with embodiments of the present invention.

FIGS. 5A and 5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a multi-view interactive digital media representation.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A to 6D illustrate examples of various capture modes for multi-view interactive digital media representations. Although various motions can be used to capture a multi-view interactive digital media representation and are not constrained to any particular type of motion, three general types of motion can be used to capture particular features or views described in conjunction multi-view interactive digital media representations. These three types of motion, respectively, can yield a locally concave multi-view interactive digital media representation, a locally convex multi-view interactive digital media representation, and a locally flat multi-view interactive digital media representation. In some examples, a multi-view interactive digital media representation can include various types of motions within the same multi-view interactive digital media representation.

Figure 6A:
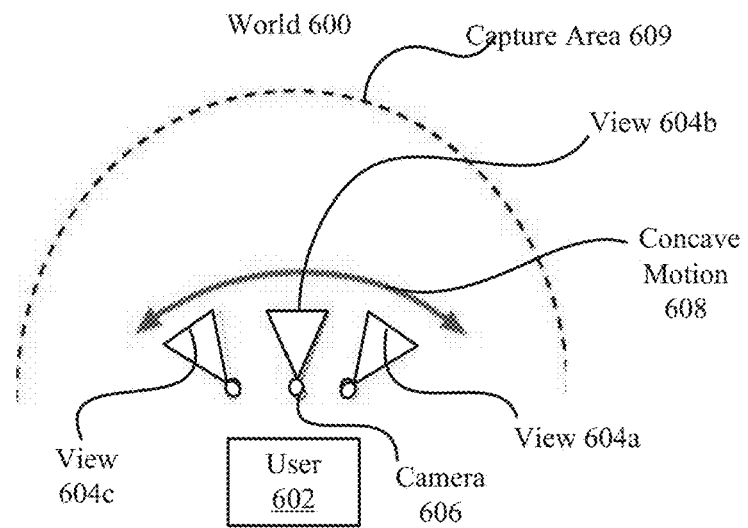
FIGS. 6A to 6D illustrate examples of various capture modes for multi-view interactive digital media representations in accordance with embodiments of the present invention.

With reference to FIG. 6A, shown is an example of a back-facing, concave multi-view interactive digital media representation being captured. According to various embodiments, a locally concave multi-view interactive digital media representation is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604a, 604b, and 604c capture various parts of capture area 609.

Figure 6B:
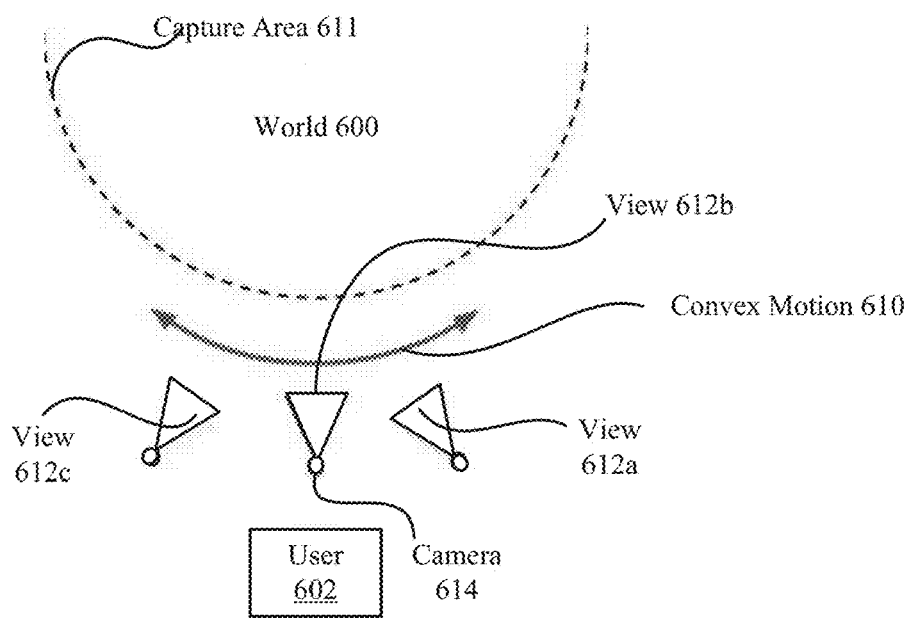

With reference to FIG. 6B, shown is an example of a back-facing, convex multi-view interactive digital media representation being captured. According to various embodiments, a locally convex multi-view interactive digital media representation is one in which viewing angles converge toward a single object of interest. In some examples, a locally convex multi-view interactive digital media representation can provide the experience of orbiting about a point, such that a viewer can see multiple sides of the same object. This object, which may be an "object of interest," can be segmented from the multi-view interactive digital media representation to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a convex motion 610, such that views 612a, 612b, and 612c capture various parts of capture area 611. As described above, world 600 can include an object of interest in some examples, and the convex motion 610 can orbit around this object. Views 612a, 612b, and 612c can include views of different sides of this object in these examples.

Figure 6C:
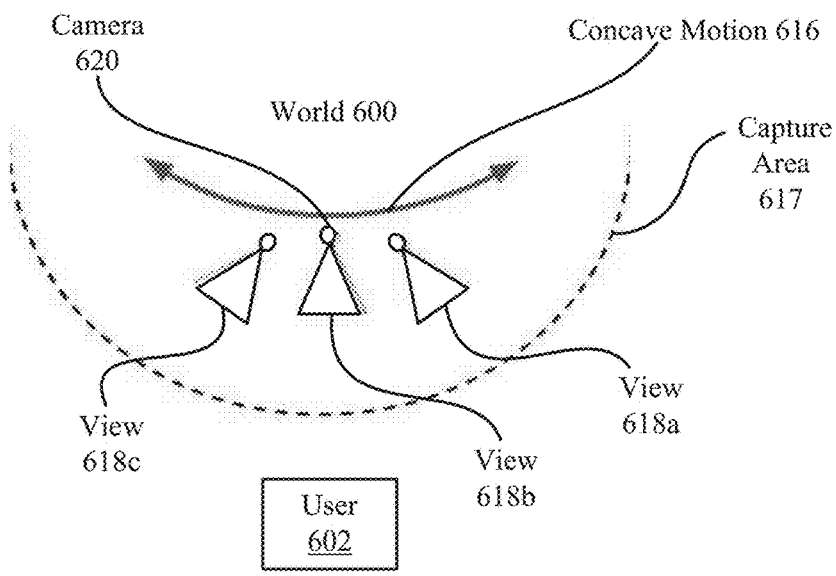

With reference to FIG. 6C, shown is an example of a front-facing, concave multi-view interactive digital media representation being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a concave motion 608 such that the views 618a, 618b, and 618c diverge from each other in an angular sense. The capture area 617 follows a concave shape that includes the user at a perimeter.

Figure 6D:
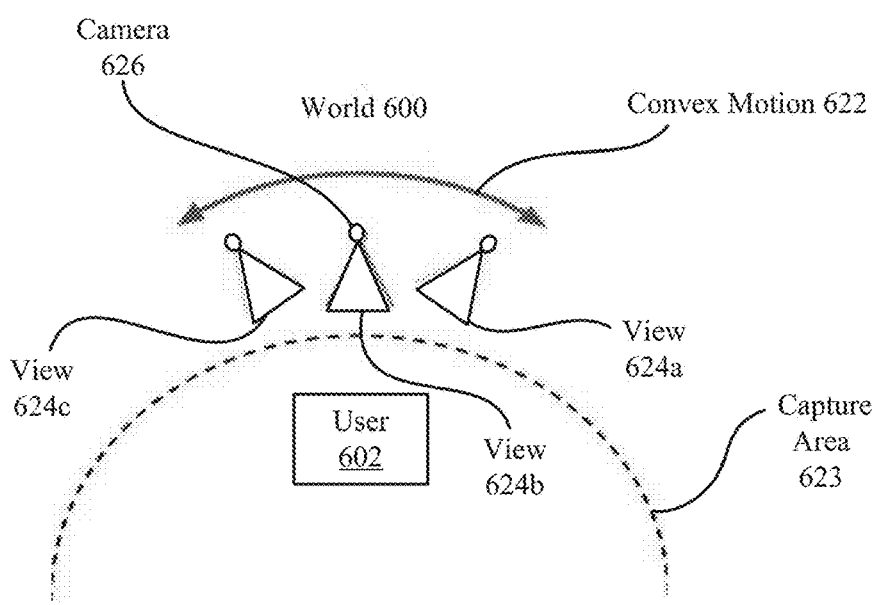

With reference to FIG. 6D, shown is an example of a front-facing, convex multi-view interactive digital media representation being captured. In the present example embodiment, camera 626 is facing user 602. The camera follows a convex motion 622 such that the views 624a, 624b, and 624c converge towards the user 602. As described above, various modes can be used to capture images for a multi-view interactive digital media representation. These modes, including locally concave, locally convex, and locally linear motions, can be used during capture of separate images or during continuous recording of a scene. Such recording can capture a series of images during a single session.

Next, with respect to FIGS. 7, 8A and 8B, a device with a camera and a sensor package is described. As described above, data from a sensor package, such as an IMU can be used to provide image stabilization. Further, data from the sensor package can be used as part of smoothing algorithms used to generate a MVIDMR as described below. Thus, some sensor capabilities and quantities that are derived from the sensors are described as follows.

IMU Data and Processing

In this section, devices, such as mobile devices, which including cameras and sensor packages are described. Image data from the camera and sensor data from the sensors can be used to generate an MVIDMR. FIG. 7 illustrates a sensor package 700 for determining orientation of a camera used to generate a MVIDMR. In one embodiment, the sensor package 700 can include a MEMS (Micro-Electro-Mechanical System) device 706. In particular embodiments, the sensor package 700 can be part of an IMU. Other types of sensor packages are possible and the example of a MEMS device 706 is provided for the purposes of illustration only.

The MEMS device 706 can include a plurality of sensors. For example, the MEMS device 706 can include a 3-axis accelerometer. The 3-axis accelerometer can be used to measure accelerations along the z axis 702a, the y axis 702b and the x axis 702c. In addition, the MEMs device can include a 3-axis gyroscope. The 3-axis gyroscope can be used to measure angular velocities, 704a (yaw) about z axis 702a, 704b (roll) about y axis 702b and 704c (pitch) about x axis 702c. In addition, a MEMs device can include an one or more axis magnetometer (not shown), such as 3-axis magnetometer. In various embodiments, a sensor package 700 can include one or more of accelerometers, gyroscopes, magnetometers or combinations thereof.

The sensor package 700 can output sensor data 708. An IMU, which can include a sensor processing system, such as 710, can receive the sensor data 708 and determine an orientation of a device. For example, gyroscopic data 712 can be integrated to determine angular changes about the pitch, roll and yaw axes. Magnetometer data 714 can be used to determine a heading or direction 724 relative to the Earth's magnetic poles. Accelerometer data 716 can be used to determine a direction of the Earth's gravity vector. Further, accelerometer data 716 can be integrated once to determine a velocity of the device and twice to determine distance changes.

The orientation 722 of a device relative to a reference coordinate system can be described with three angles, i.e., pitch, roll and yaw angles. For example, the accelerometer data 716, such as from a 3-axis accelerometer, can provide a pitch and roll orientation of a device relative to the Earth's gravitational vector. The magnetometer data 714, if available, can be used to provide a yaw angle. Gyroscopic data 712 can be used to provide changes to the pitch, roll and yaw angles. Thus, if an initial orientation of a device is known and it begins to rotate, the gyroscopic data can be used to determine an orientation of a device as a function of time.

FIG. 8A illustrates a mobile device 720 with a sensor package, such as the MEMs device 706 shown in FIG. 7. For example, the MEMs device 706 can be installed in mobile device 720 with its axes aligned as depicted in the FIG. 8A. The mobile device 720 can include one or more cameras (not shown) facing in the negative Z direction along axis 702a and one or more cameras facing in the positive Z direction. An exemplary field of view of at least one camera facing in the negative Z direction is indicated by rays 725.

When the fields of view of two or more cameras overlap, knowledge of the distance between the cameras can be used to obtain distance data, i.e., the distance of the camera to objects captured in the image data. For example, the mobile device 720 can include two cameras facing in the negative Z direction with overlapping fields of view. Where the fields of view overlap, the distance to objects from the cameras, and hence mobile device 720, can be estimated based upon a comparison of image data taken from both cameras. In another example, a structured light system can be used, such as a Kinect™ sensor. The structured light system can use a light source, such as an infrared light generator and a sensor for detecting light reflected from objects.

When mobile device 720 is a rigid body, then based upon a position and orientation of the camera relative to the body of mobile device 720, the orientation of the camera can be determined based upon the orientation of body of the mobile device 720. In this example, a camera is aligned with the Z-direction at some position on the face of the body of device facing in the negative Z direction. As described with respect to FIG. 8A, the orientation of a body of the device can be determined from the sensor package. Hence, based upon its position on mobile device 720, the orientation of the camera can be derived from data from the sensor package.

In other examples, a camera can be configured so that it is not aligned with negative Z direction, such as pointing at an angle relative to the negative Z axis. For instance, the mobile device 720 a first camera can be aligned with the negative Z axis and then one or more additional cameras can be configured to point at angles relative to the negative Z direction. The light gathered from the multiple cameras can be combined to provide a wider field of view. In another example, a camera can be designed to mechanically sweep through an angle to provide a wider field of view.

In yet another example, mobile device 720 may not be a rigid body. For example, mobile device 720 can include a flexible housing. When the housing is flexible, sensors may be included which measure an amount of bending. Based upon the amount of bending determined from the sensors and data from a sensor package, such as a sensor package on an IMU, an orientation of the camera on a flexible body can be determined.

Next, examples are considered where the mobile device 720 is allowed to move generally in 3-D space. FIG. 8B illustrates pitch and roll of a mobile device 720 and angle changes as a function of time relative to the gravity vector during image acquisition for MVIDMR generation. The direction of the gravity vector is indicated by 802a. An orthogonal coordinate system associated with the gravity vector is indicated by 802b and 802c. The gravity vector can be used to determine a ground plane on which a person is resting, such as a surface on which a person is standing.

The direction of the body centered coordinate system for mobile device 720 is indicated by 804a, 804b and 804c. The direction of the camera is in the negative Z direction as in the previous pictures. The pitch and roll orientation of the mobile device 720 relative to the gravity vector can be determined using sensor data from the 3-axis accelerometer. As described above, if a magnetometer data is available, then it may be possible to obtain yaw data.

The gyroscopic data can be used to determine a roll rate of the mobile device 720 about axis 804b and the pitch rate about 804c. The roll rate can be integrated to obtain an amount of roll between a first time and a second. The pitch rate can be integrated to obtain an amount of pitch between a first time and a second time.

In one embodiment, the angular rotation amount of mobile device 720 during an MVIDMR image acquisition can be determined using just the roll rate or pitch rate. If the device is orientated in a portrait mode and the user plans to pan around an object with this orientation, then the roll rate from the gyroscopic data as a function of time can be integrated to determine a total roll angle amount as a function of time. In one embodiment, negative roll rates can be ignored for the purposes of determining the total roll angle amount. The total roll angle amount as a function of time can be used to estimate the angular view of an object that has been captured during image acquisition.

If the mobile device 720 is orientated in a landscape mode and the user plans to pan around an object with the device in this orientation, then the pitch rate from the gyroscopic data as a function of time can be integrated to determine a total pitch angle as a function of time. In this example, negative pitch rates can be ignored for the purposes of determining the total pitch angle amount. The total pitch angle amount as a function of time can be used to estimate the angular view of an object that has been captured during the image acquisition process.

In one embodiment, the MVIDMR system can present a user with a selection of a type of path for the device to follow and an orientation of the device that is to be used during the path. Based upon the input provided by the user, the MVIDMR system can determine whether to determine the total pitch angle amount or the total roll angle amount for the purposes of determining an angular view amount of an object that has been captured as a function of time. In these embodiments, as roll rate data and pitch rate data is being integrated, the orientation of the device as a function time may not be needed. However, a starting time to begin the integration of the roll rate data or the pitch rate data and an ending time may have to be determined. In one embodiment, the start and stop can be determined based upon a user selecting a button in an input interface, i.e., the user can select a button to start the image capture and end the image capture.

In another embodiment, the sensor data from the 3-axis accelerometer can be used. The 3-axis accelerometer can be used to determine a roll and pitch orientation of the mobile device 720 relative to the gravity vector (gx, gy and gz) as a function time. For example, in FIG. 8B, the device is pitched by pitch angle 808 about the gx axis 802c and rolled about the gravity vector gz 802a by a roll angle 806 at time $t_1$. The yaw angle amount about the gy axis 802b is not determined using the 3-axis accelerometer data. As described above, it can be set to an arbitrary value such as zero degrees.

At $t_1$, the first value of angles 806 and 808 provide an orientation of the Z axis 804a (or negative Z axis) in the coordinate system associated with the gravity vector (802a, 802b and 802c). As described above, a camera on mobile device 720 can be orientated in the negative z direction. At $t_2$, the magnitude of the value of the pitch angle 808 can increase or decrease relative to its value at $t_1$ and the magnitude of the value of the roll angle 806 can increase or decrease relative to its value at $t_1$. The values of the pitch angle 808 and roll angle 806 at time $t_2$ again determine the orientation of the negative z vector in the coordinate system associated with the gravity vector.

In one embodiment, at different times, such as between $t_1$ and $t_2$, an angle value can be determined between the 3-D camera direction vectors, which is the negative z direction in the camera based coordinate system. In this example, the 3-D camera direction vector at each time can be determined in the gravity based coordinate system (802a, 802b and 802c) using the pitch and roll angles about the gx 802c and gz 802a axes obtained from the accelerometer data. The yaw angle about the gy 802b vector can be set to zero or some other fixed value (no yaw change as a function of time). With pitch, roll and yaw angles in the gravity based coordinate system for 3-D camera vector known as a function of time, the change in the angle between the 3-D camera direction vector at two different times, such as between times, $t_1$ and $t_2$, can be determined.

The angle changes can be summed to determine a total angle change as a function of time. The angle change is approximately around the gravity vector gz 802a. The total change in angle can be used to estimate an angular view of an object captured by the camera. Thus, the angular view of the object captured as function of time can be determined and output to a display screen. Like the examples described above, a rotation direction that is needed along the path to keep the object in view of the camera can be determined, i.e., clockwise or counter clockwise. Further, angle changes, in the direction that is not needed, can be ignored for the purposes of determining the angular rotation amount in the rotation direction that is needed to keep the object in view of the camera.

In another embodiment, the angle changes can be projected into a particular plane. For example, a circle 812 is shown in a plane perpendicular to the gravity vector. The 3-D camera direction vector can be projected into this plane. Then, the angle changes of the 3-D camera direction vector projected into this plane from time to time can be determined, such as 810. Like the examples described above, a rotation direction that is needed along the path to keep the object in view of the camera can be determined, i.e., clockwise or counter clockwise. Further, as described above, angle changes in the plane in the direction that is not needed can be ignored.

Session Tagging

In this section, methods and apparatus for efficiently tagging an MVIDMR of an object are described. The tags can be placed at different locations on an object. The tags incorporated into an MVIDMR can be selectable. In one embodiment, when a selection of a tag is detected, media content associated with the tag can be output. In some instances, the media content can include close-up views of the location where the tag is placed on the object.

To illustrate session tagging, screen shots of an interface for generating an MVIDMR of an object and placing tags on the object in the MVIDMR are described with respect to FIGS. 9A to 9K. In these figures, the object is a car. However, the example of a car is provided for the purposes of illustration only and is not meant to be limiting.

Figure 9A:
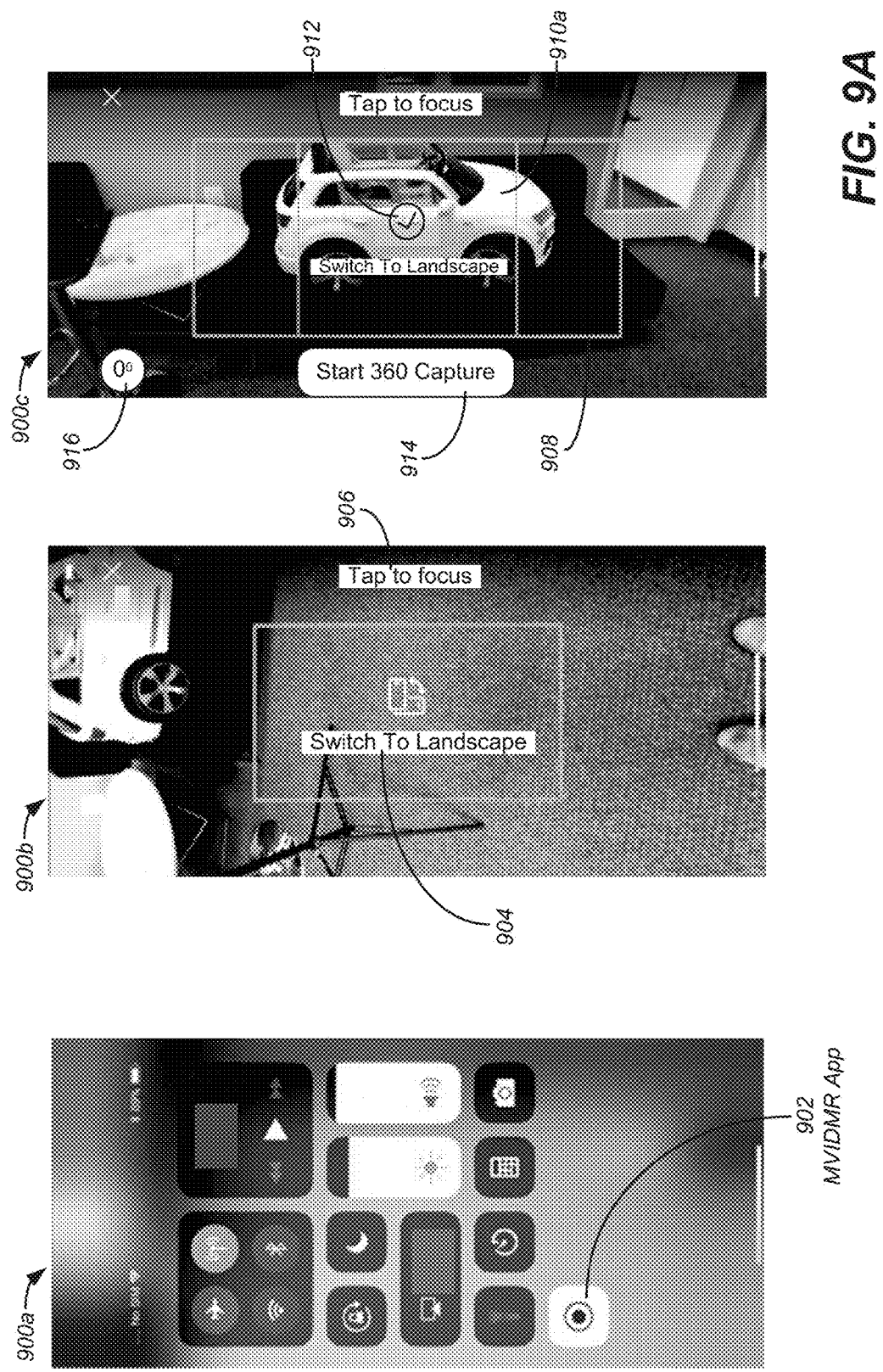
FIG. 9A to 9K are screen shots of an interface for generating an MVIDMR and placing tags in accordance with embodiments of the present invention.

In FIG. 9A, screen shots 900a, 900b and 900c of an interface on a mobile device are shown. In 900a, an initial screen shot including a plurality of selectable icons is shown. A first icon 902 can be for an MVIDMR application. When the first icon 902 is selected, such as via a touch screen sensor, screen shot 900b can be generated which include live video images from a camera coupled to the mobile device. Option 904 to switch to a landscape mode is provided in the interface. Further, an option 906 to tap on an object in the frame on which to focus is provided in the interface. In another embodiment, the message "switch to landscape mode" can be a requirement for the capture.

In 900c, landscape mode is selected. A frame 908 is rendered over the live video image to help keep the image frames centered on a selected object. In this example, the car 910a is selected as an object for an MVIDMR capture as indicated by the check mark 912 and the camera is focused on the car 910a. A selectable button 914 is generated which can be used to start the MVIDMR image capture process.

An indicator 916 can be used to indicate an amount of angular view of the car 910a that has been captured. In one embodiment, the angular view can be determined from IMU data as described above with respect to FIGS. 7A, 8A and 8B. Initially, the angular view in the indicator 916 is set at zero degrees.

Figure 9B:
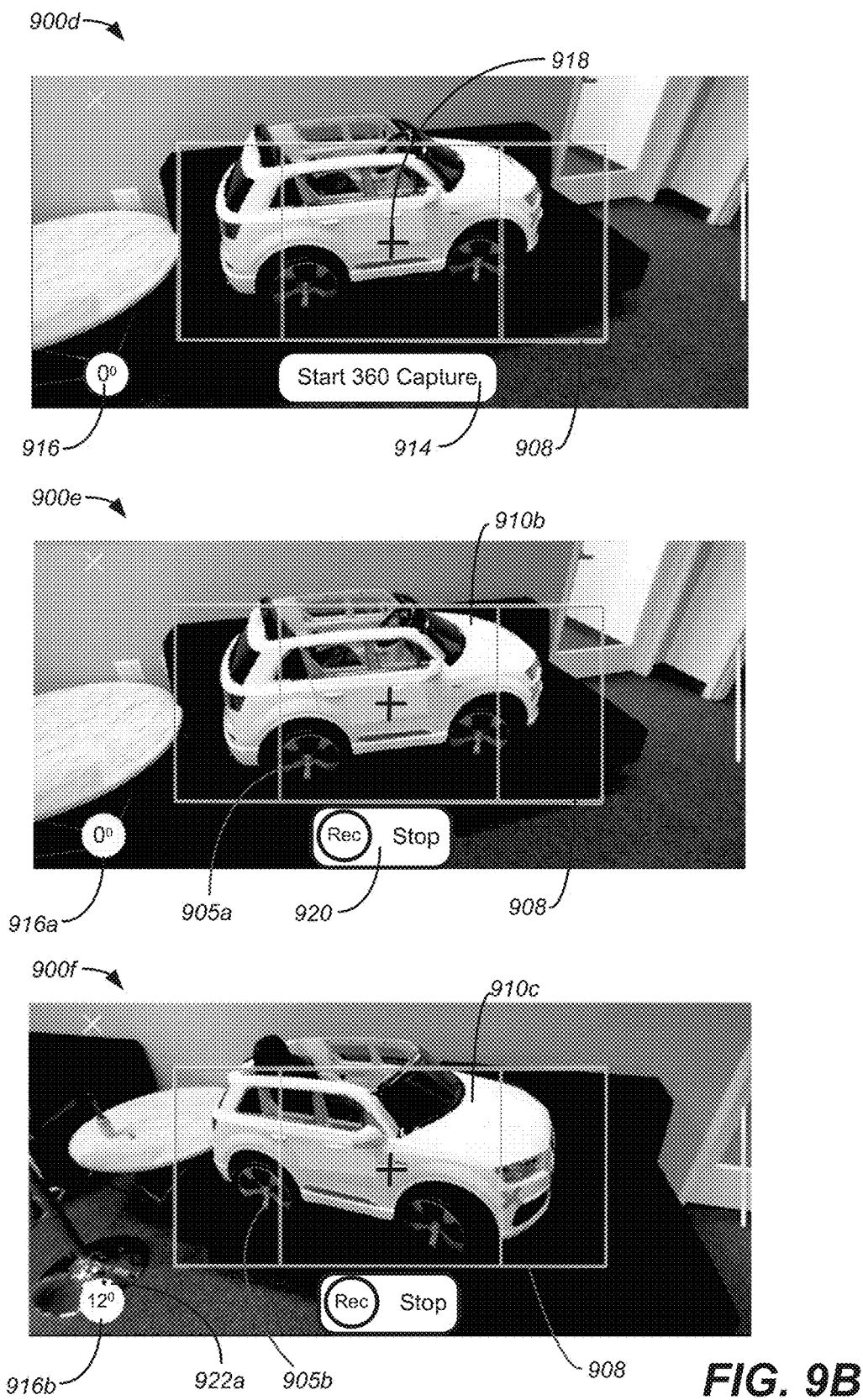
Figure 9C:
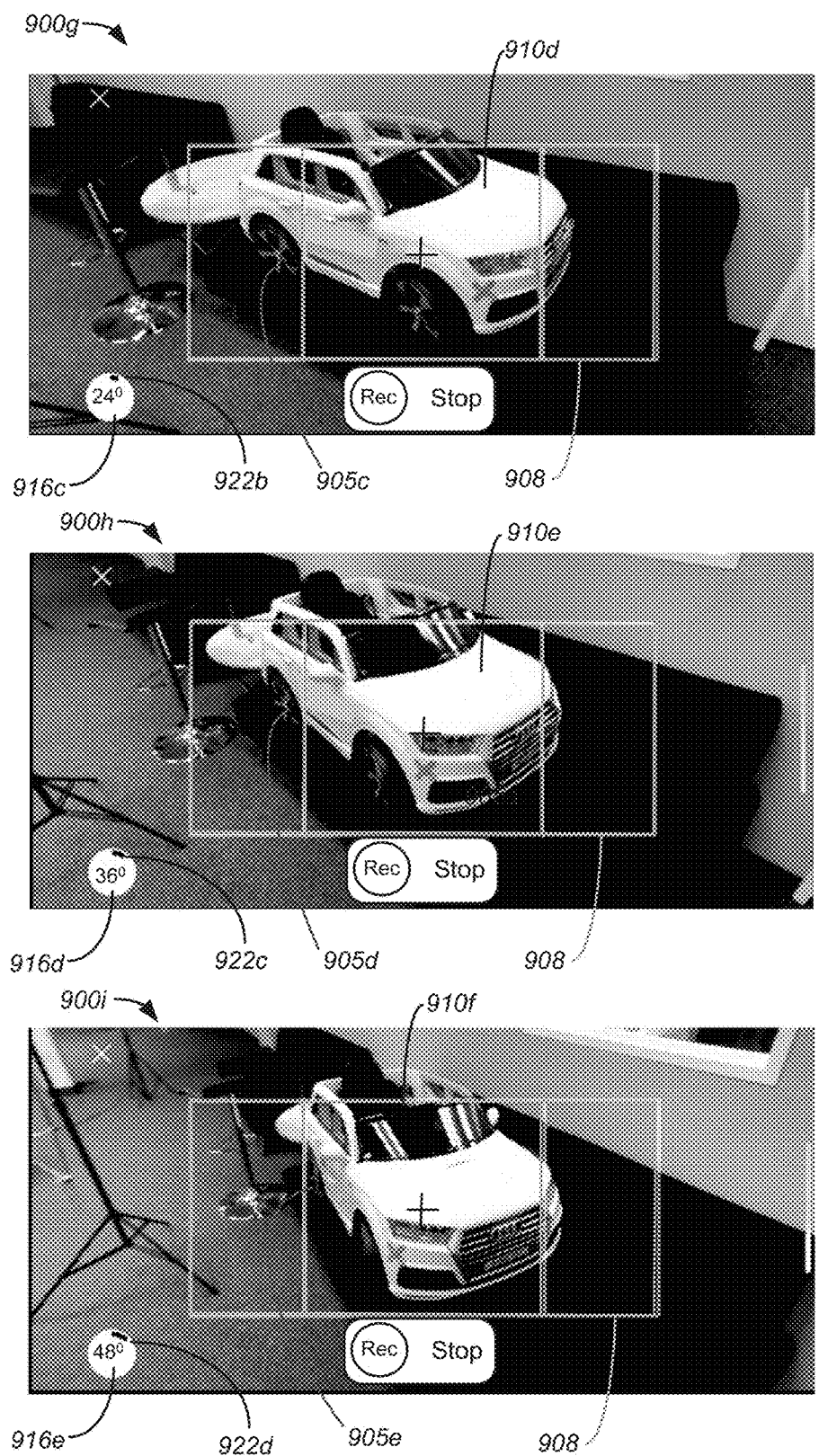

In FIG. 9B, screen shots 900d, 900e and 900f are shown. In 900d, a cross 918 is rendered over the object to be captured. The cross can be used to help keep the object centered in the frame 908. In 900d, selectable button 914 is selected and MVIDMR capture can be initiated.

Figure 9D:
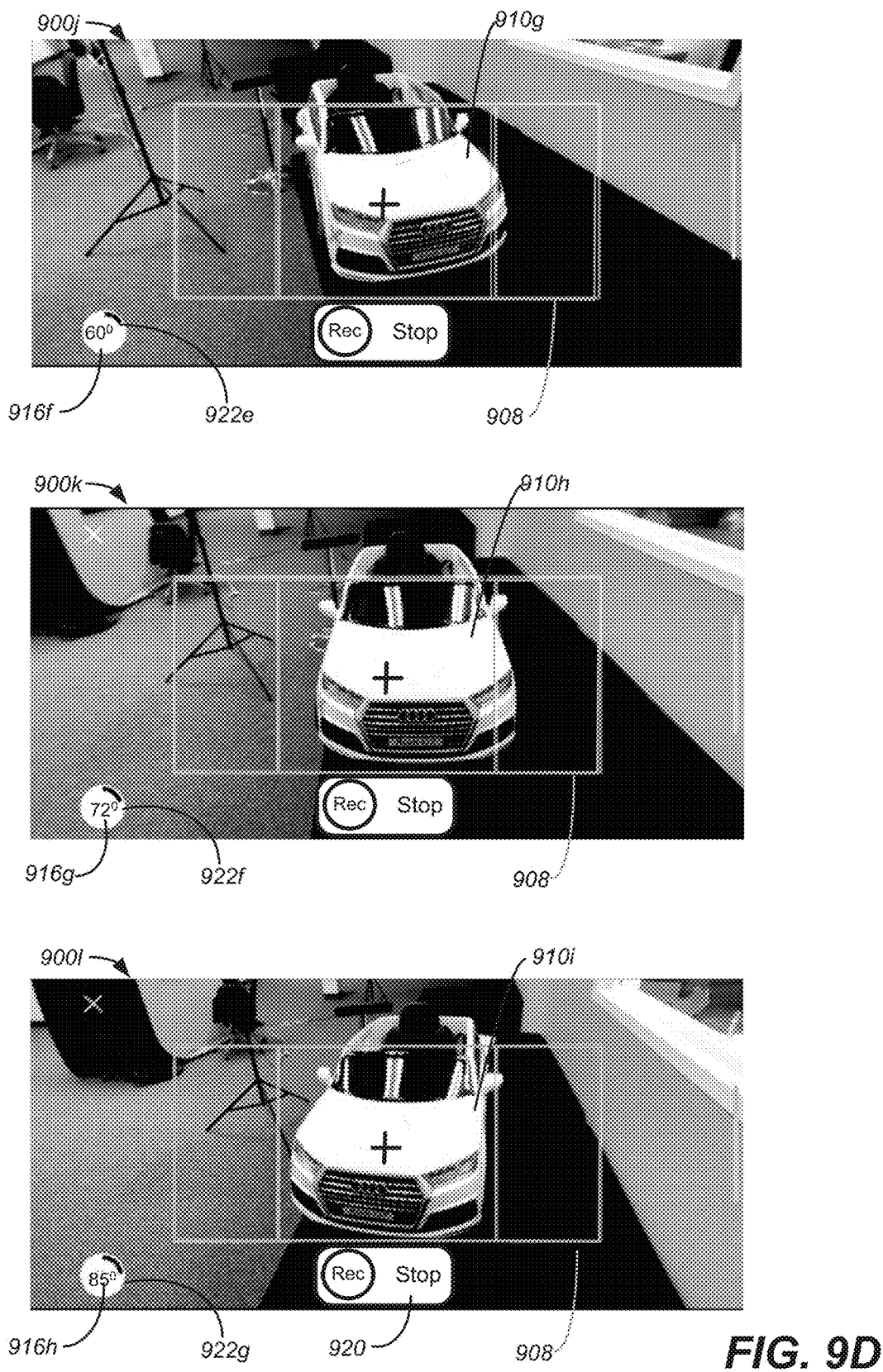
Figure 9E:
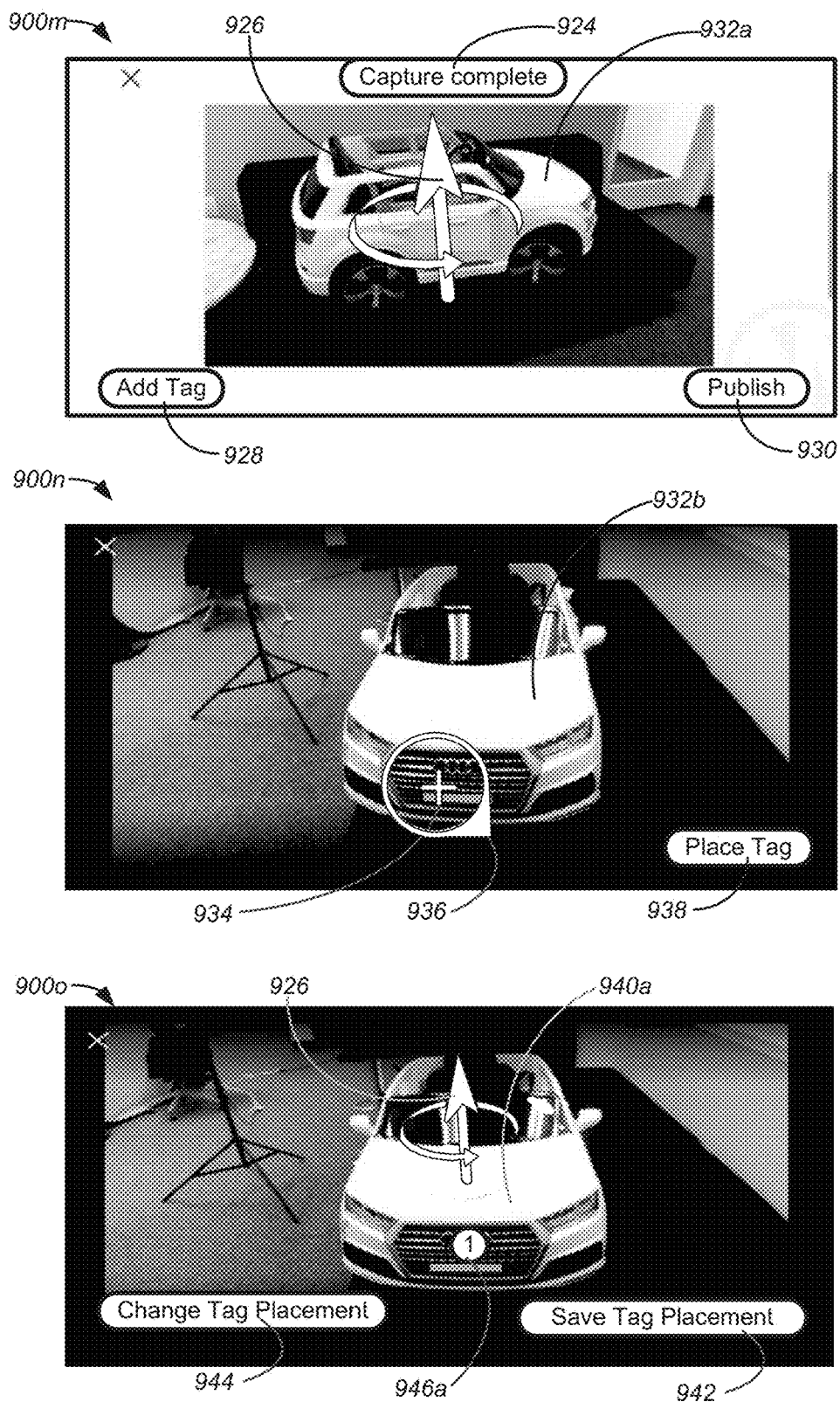
Figure 9F:
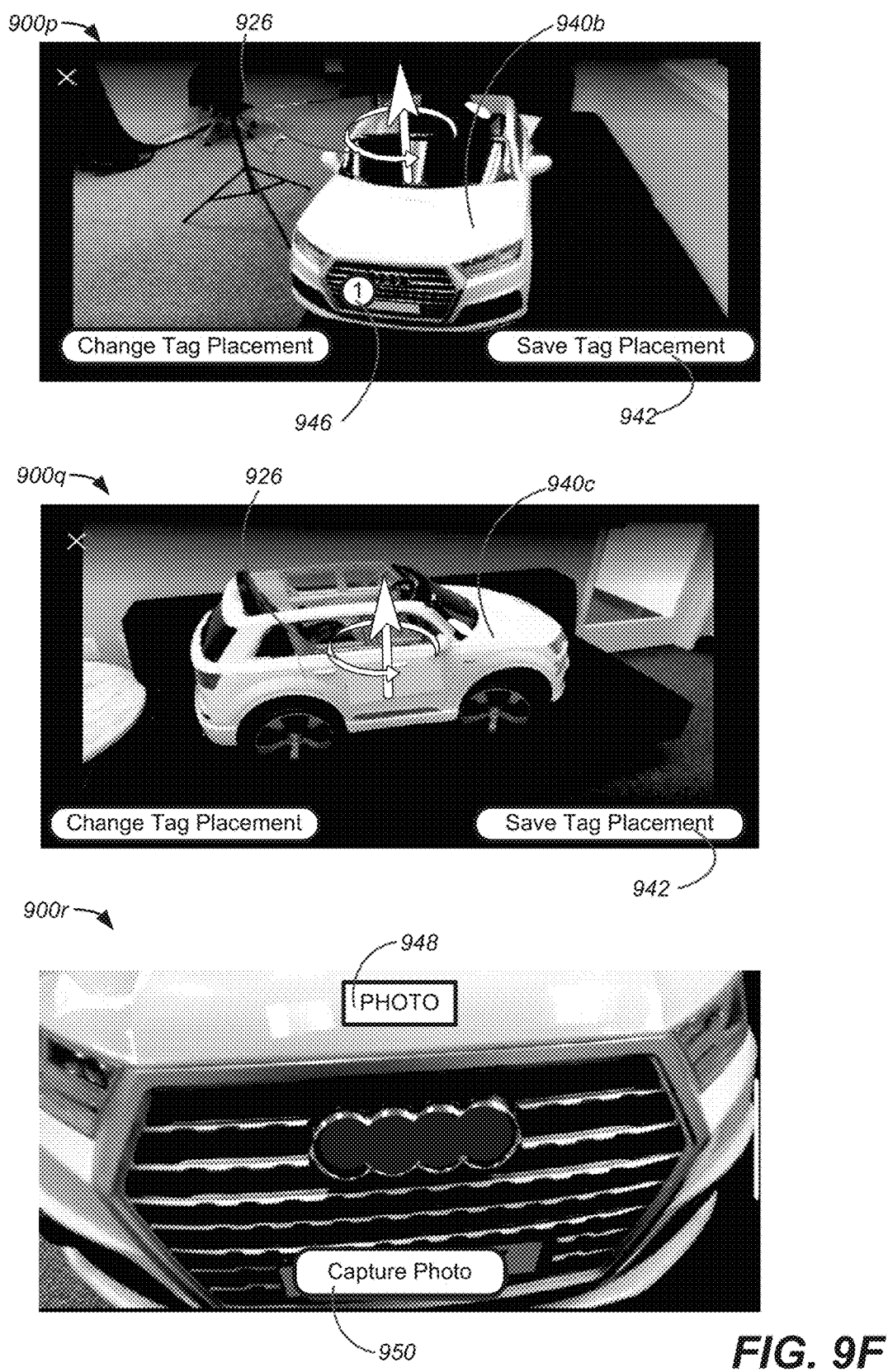
Figure 9G:
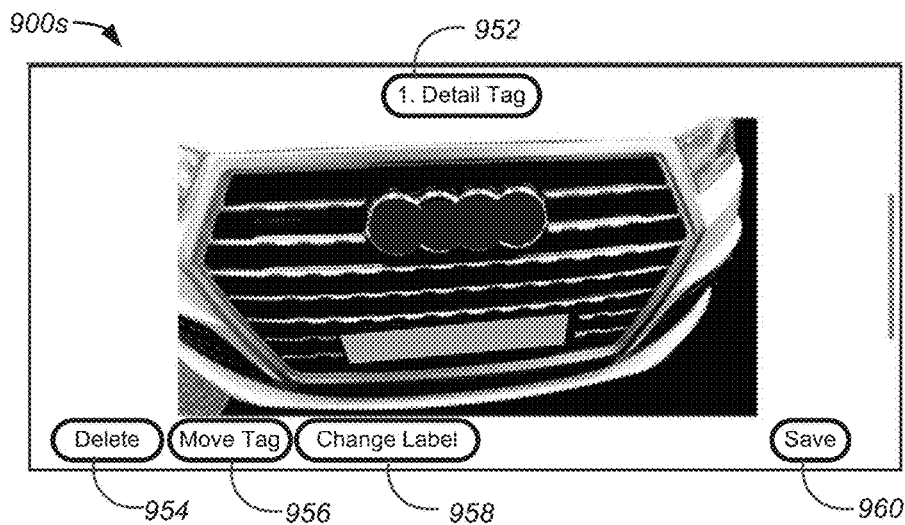
Figure 9G:
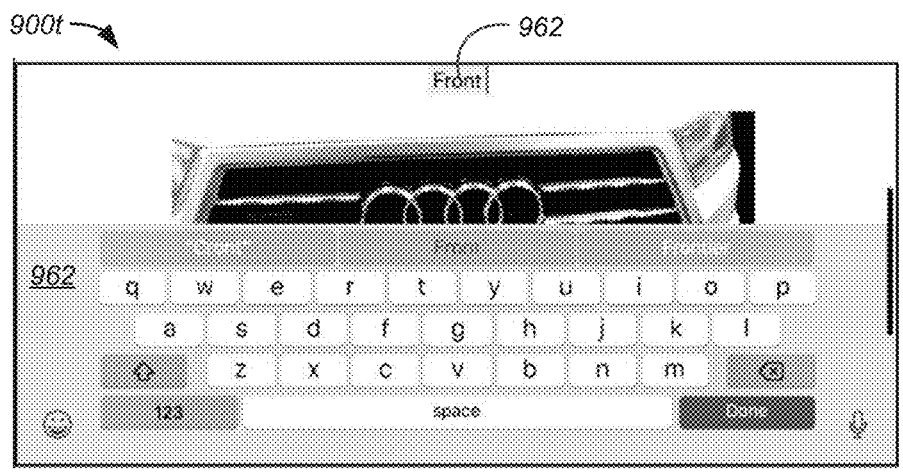
Figure 9G:
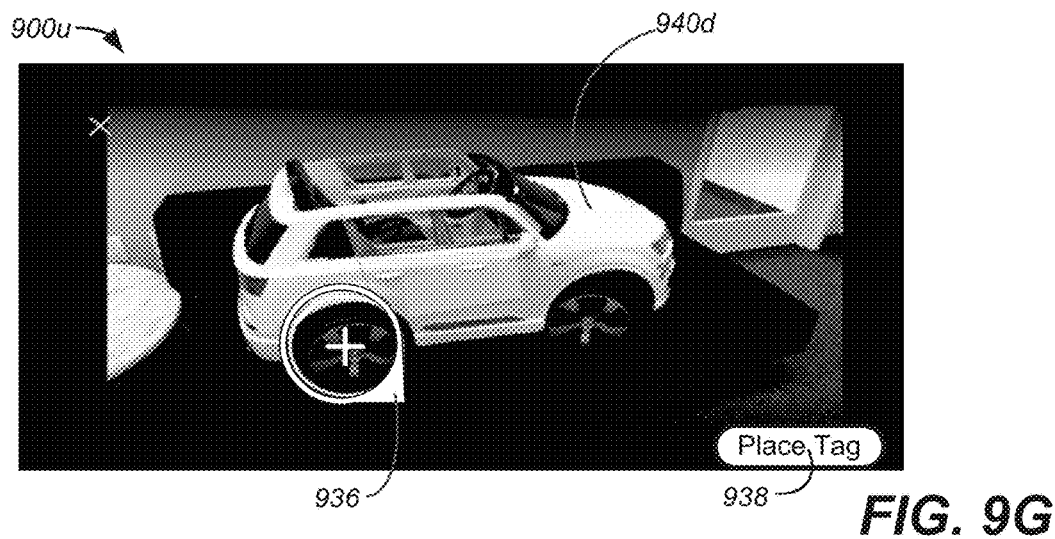
Figure 9H:
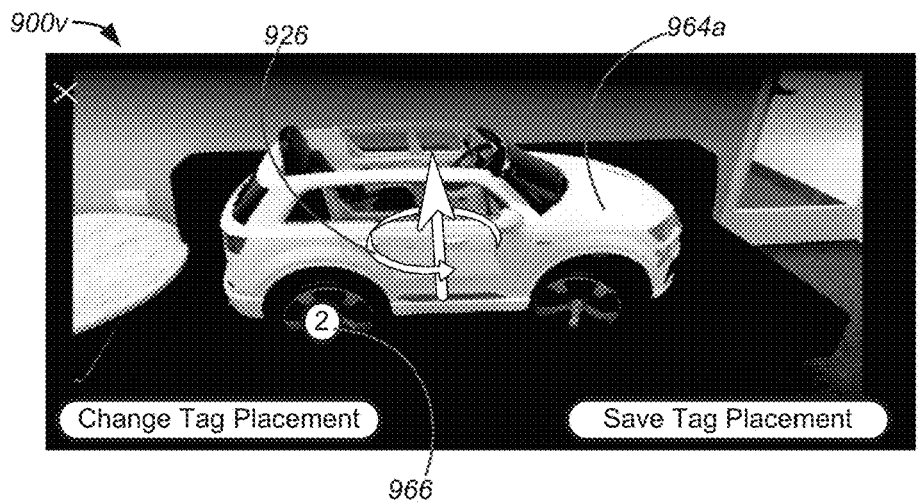
Figure 9H:
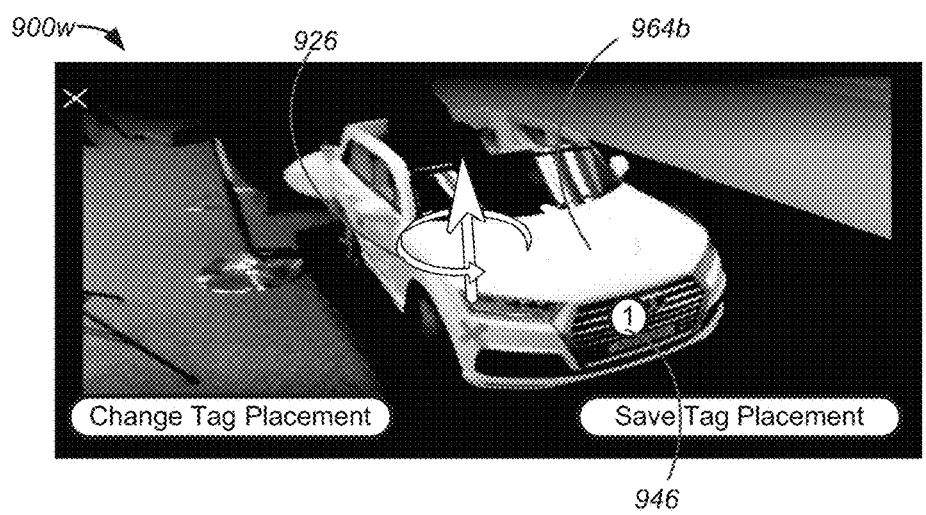
Figure 9H:
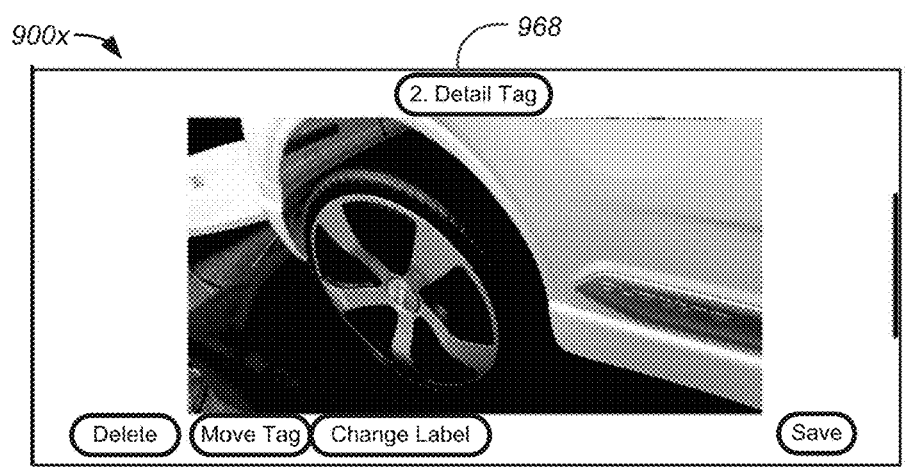
Figure 9I:
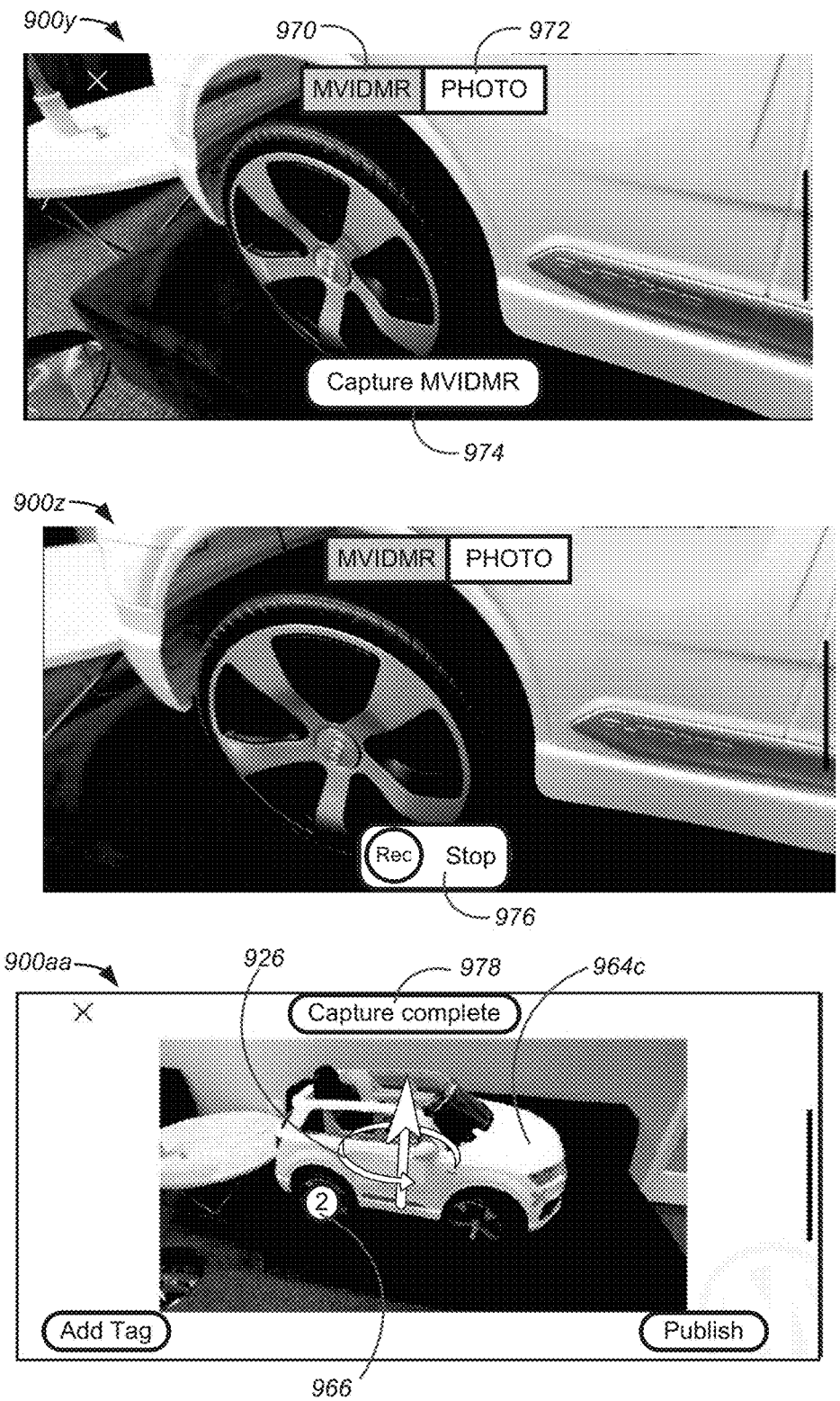
Figure 9J:
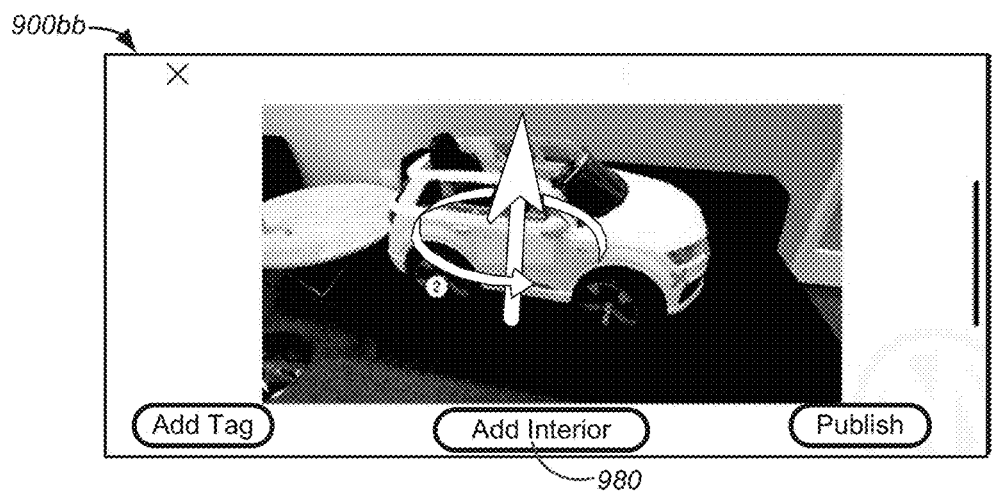
Figure 9J:
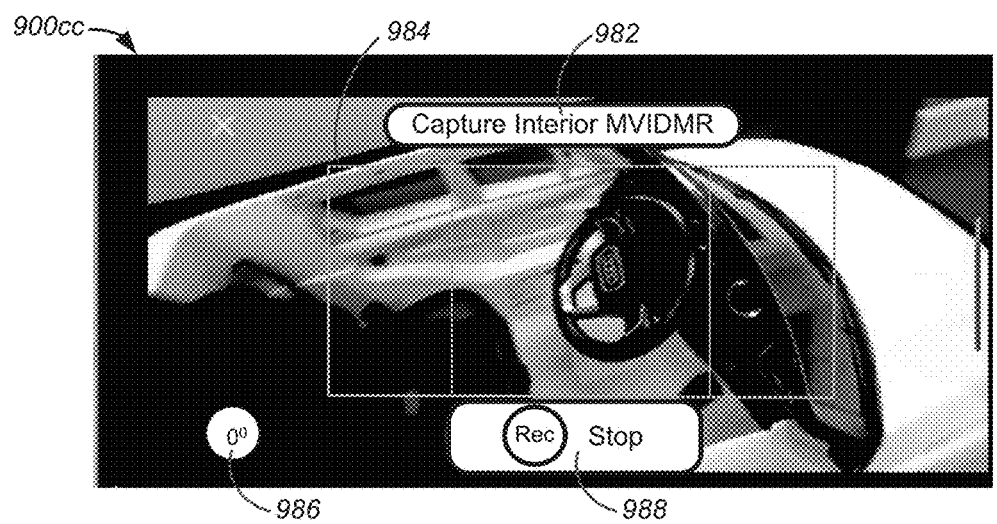
Figure 9J:
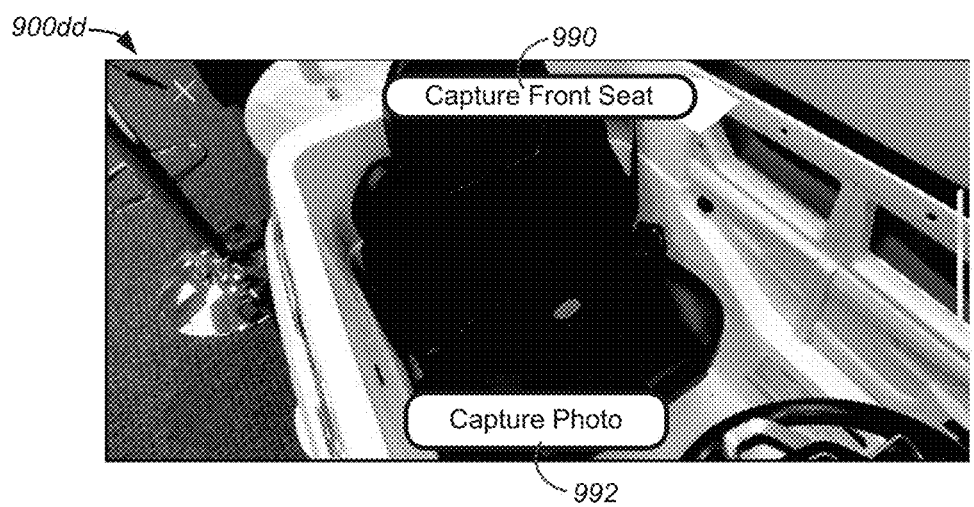
Figure 9K:
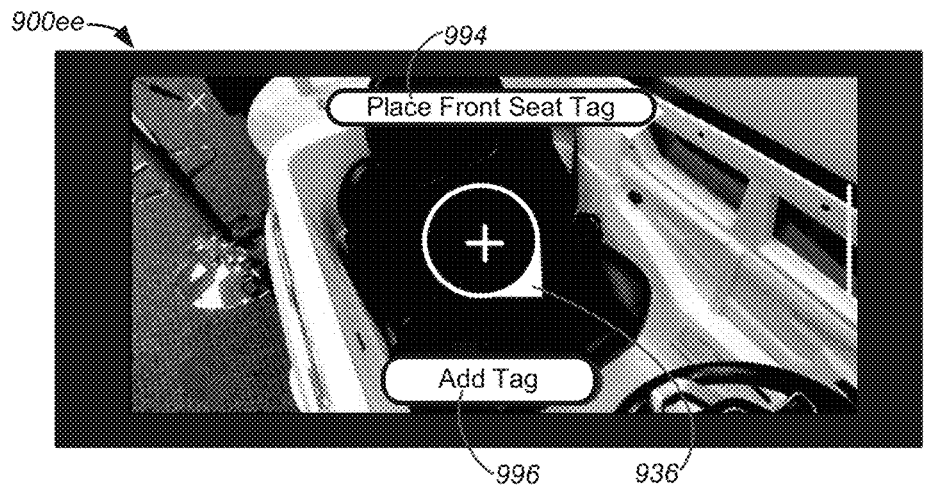
Figure 9K:
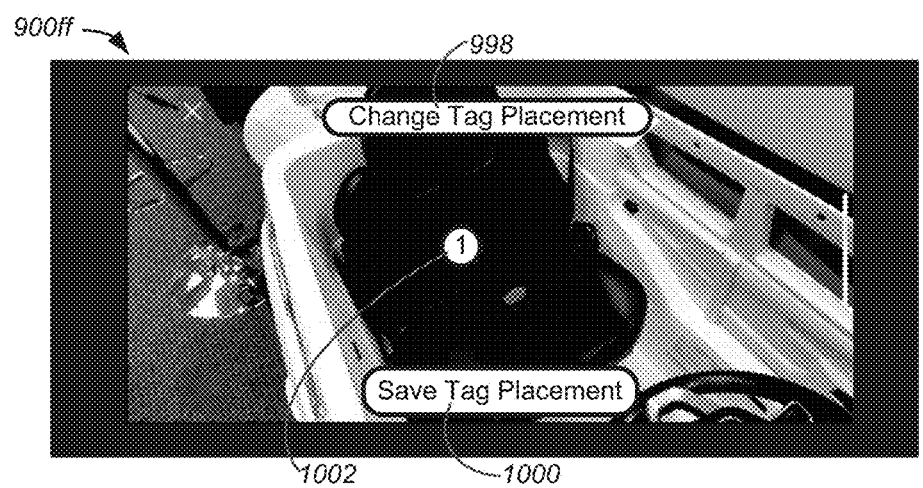
Figure 9K:
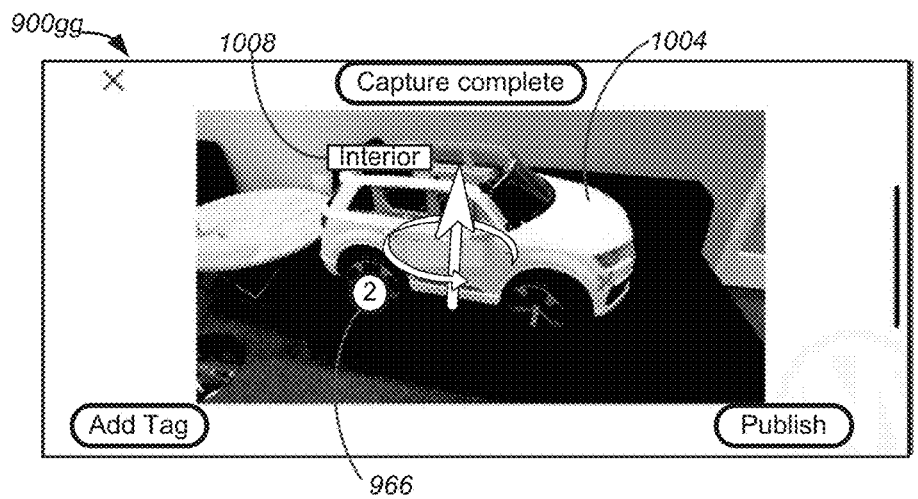

With respect to screen shots 900e and 900f in FIG. 9B, screen shots 900g, 900h and 900i in FIG. 9C and 900j, 900k and 900l in FIG. 9D, image frames captured for an MVIDMR of the object (the car) are shown. The record and stop button 920 can be used to start and stop recording of the images frames from the live video stream.

The total angular view of the car which is currently captured is eighty five degrees as shown in screen shot 900l. Different views, 910b, 910c, 910d, 910e, 910f, 910g, 910h and 900i, of the car are shown as the total angular view increases. Additional different views of the car can be captured and these are provided for the purposes of illustration only and are not meant to be limiting.

In more detail, screen shot 900e shows an angular view of zero degrees, as shown in indicator 916a. Screen shot 900f shows an angular view of twelve degrees as shown in indicator 916b. The indicator 916b includes a textual indicator and a line indicator 922a. The line indicator 922a shows a fraction of a circle associated with the textual indicator.

Screen shot 900g shows an angular view of twenty four degrees as shown textually in indicator 916c and graphically represented by the line indicator 922b. Screen shot 900h shows an angular view of thirty six degrees as shown textually in indicator 916d and graphically represented by the line indicator 922c. Screen shot 900i shows an angular view of forty eight degrees as shown textually in indicator 916e and graphically represented by the line indicator 922d. Screen shot 900j shows an angular view of sixty degrees as shown textually in indicator 916f and graphically represented by the line indicator 922e. Screen shot 900k shows an angular view of seventy two degrees as shown textually in indicator 916g and graphically represented by the line indicator 922f. Finally, screen shot 900l shows an angular view of eighty five degrees as shown textually in indicator 916h and graphically represented by the line indicator 922g.

As will be described in more detail as follows, methods and apparatus for efficiently adding selectable tags to an object are described. In one embodiment, one or more selectable tags can be added to the frames of the MVIDMR of an object after the MVIDMR of the object is generated. During output of the MVIDMR to a display, a detected selection of the selectable tag can cause media content associated with the location where the selectable tag is placed on the object to be output. For example, a selectable tag can be placed on a wheel of a car in an MVIDMR of the car such that when selected causes the media content about the wheel to be output to the display.

Different views of an object can be shown in the MVIDMR. Thus, the locations on the object that appear in each of the plurality of frames of the MVIDMR can vary from frame to frame. In particular, a first location on an object may appear in only a portion of the frames of the MVIDMR, i.e., the first location can move into and out of view. In addition, because the view of the object is changing in the MVIDMR, the position where the first location on an object appears in each frame of the MVIDMR can vary from frame to frame. Thus, if a selectable tag is placed at the first location, the position where the selectable tag appears in each frame can vary from frame to frame and may appear in only a portion of the plurality of frames of the MVIDMR.

As an example, with respect to screen shots 900e, 900f, 900g, 900h and 900i, a location on the object, which is the center of the back wheel on the car, is shown. The physical location pointed out, i.e., the center of the wheel, on the object is the same in each frame. However, a first location in the frame, 905a, 905b, 905c and 905d, i.e., in pixel space, where the physical location appears, changes from frame to frame because the view of the object is changing from frame as frame. Also, the camera can be moving relative to the object. After screen shot 900i, which corresponds to a total angular view of forty eight degrees, the physical location at the center of the wheel is no longer visible. Thus, a first position of a selectable tag placed at the center of the wheel can vary in the frames of the MVIDMR and the selectable tag may not appear in some frames.

In one embodiment, each of the plurality of frames of an MVIDMR can be associated with two dimensional pixel coordinates. When a location on an object appearing in a first frame of the MVIDMR is selected for a selectable tag, the location can be associated with the pixel coordinates of the first frame. Then, the location on the object can be estimated in the remaining frames of the MVIDMR including whether the location on the object appears or not.

For example, one or more key points appearing in the image that are in the vicinity of the selected pixel coordinate can be determined. Then, the key points can be tracked from frame to frame in the remaining frames of the MVIDMR. In each of the remaining frames, the location of the tracked key points can be used to estimate where the selected location on the physical object appears in the pixel coordinates of the remaining frames including whether the location appears at all. Then, the selectable tag can be rendered at the estimated location determined for each frame.

As an example, screen shots 900e, 900f, 900g, 900h, 900i and 900j, can be used as frames in an MVIDMR. In a first frame associated with screen shot 900e, a location 905a in the center of the wheel can be selected. Then, one or more key points near location 905a can be tracked to frames 900f, 900g, 900h, 900i and 900j. The locations of the one or more tracked key points can be used to estimate where location 905b occurs in 900f, where location 905c occurs in 900g, where location 905d occurs in 900h and where location 905e occurs in 900i. Then, the selectable tag can be rendered at the estimated locations in each of the frames. In 900j, the key point tracking can indicate the feature, i.e., the center of the wheel no longer appears. Hence, a selectable tag may not be rendered in this frame.

The use of key point tracking is one example of determining where a location on an object in one frame of an MVIDMR appears in other frames. Hence, the methods and apparatus are not limited to key point tracking. For example, key points can be matched between frames, which can be referred to as key point matching. Thus, a key point appearing in one frame, such as a selected location on an object, can be matched to the key point appearing in another frame. In another example, in skeleton detection on an object, such as a person or car, a group of locations on the object can be identified and then linked together in some manner via pre-defined relationships to provide a 3-D representation of the object.

For example, on a car, components, such as the centers of the wheels, tail lights, headlights, side mirrors can be identified and then linked together to provide a 3-D structure for the car. The linkages can define geometric relationships. For example, the front wheels of a car can be joined by a line that is perpendicular to a line drawn between the front and back wheels of a car on the same side of the car. Similarly, a line can be drawn between the front headlights that is approximately parallel to the lines drawn between the wheels. In another example, a line can be drawn between the front wheel and the front headlight on the same side. This line can be approximately perpendicular to the line drawn between the two front wheels.

If depth data is available, such as from a stereoscopic camera, this information can also be used to construct a 3-D structure of an object. The depth data can be used to position various locations on an object in a 3-D coordinate system relative to one another. In one embodiment, when a 3-D structure of an object is determined, it can be projected onto a 2-D plane to create a plan view of the object.

After a 3-D structure is determined for an object, other locations on the car can be referenced relative to this determined 3-D structure when a location selected in one frame is propagated to other frames. As another example, on a person, joints can be identified. Then, a skeleton and a pose of the person can be determined in various frames. The pose detection can be used to provide relative 3-D positioning of locations on the skeleton. Then, the skeleton and the pose data associated with the person can be used to help propagate locations from frame to frame.

In yet another example, the interface can be configured to allow a user to select the same location on the object in two or more different frames. Then, the location on the object can be approximated in 3-D, such as via triangulation. Then, in the remaining frames, the 3-D tag location can be projected into the frame to determine the location on the object in each frame.

Next, methods and apparatus for placing selectable tags in an MVIDMR are illustrated with respect to FIGS. 9E, 9F, 9G, 9H and 9I, which include screen shots, 900m, 900n, 900o, 900p, 900q, 900r, 900s, 900t, 900u, 900v, 900w, 900x, 900y, 900z and 900aa of one embodiment of interface implemented on a mobile device. In screen shot 900*m* of FIG. 9E, image frame capture for an MVIDMR of the car 932*a* is complete. This completion of the image capture is indicated by the prompt 924 which says "Capture complete."

From the captured images from the live video stream, an MVIDMR of the object, which is the car, can be generated. In particular embodiments, a first plurality of the frames captured from the live video stream can be processed, such as smoothed and stabilized to generate an MVIDMR of the object, which is a car in this example. Via the interface, the user may be able to navigate through the second plurality of frames of the MVIDMR. The navigation capability is indicated by the arrows 926. For instance, a user can use input devices associated with a mobile device to cause different views of the car to be output to the display.

In 900*m*, the interface can provide a capability to add a selectable tag to the MVIDMR. Alternatively, via the "publish" prompt 930, the MVIDMR can be saved for later viewing. For example, the MVIDMR can be published to a website for subsequent viewing.

In response to the "Add Tag" prompt 928 being selected in 900*m*, an interface state is generated that allows a selectable tag to be placed at a location on the object in the MVIDMR, which is the car in this example. A selector 936 which includes a circle with a cross 934 is provided which allows the location on the object in the image frame to be selected. The pixel coordinates beneath the center of the cross can be the location on the object which is selected when the "place tag" prompt 938 is selected. A selectable tag can then be rendered at the location or at a position relative to the location selected on the object, such as adjacent to the location.

Using an input device, such as a touch screen on the mobile device, the selector 936 can be positioned within the current frame of the MVIDMR of the object output to the display. For the example, using the touch screen sensor, the selector 936 can be moved from its current position over the front grill of the car to a new position over the hood. As another example, using the touch screen sensor, the selector can be moved from its current position over the front grill of the car to a new position over the seat.

In particular embodiments, the object can be differentiated from the background. Thus, if the selector 936 is placed over the background and attempt is made to place a selectable tag on the background. The interface can be configured to indicate that placing a selectable tag on the background is not allowed or the selected location is not on the object.

In other embodiments, the interface can be configured to allow navigation through the MVIDMR of the object. Thus, prior to selecting a location on the object, the current view 932*b* of the object in a first frame can be changed to a different view of the object in a second frame. Then, a location on the object can be selected using the image data from the second frame and the selector 936.

In 900*n*, the place tag prompt 938 is selected. The selection of prompt 938 causes a selectable tag to be rendered at the location of the cross 934. In 900*o*, a selectable tag 946 is shown. The selectable tag 946 is a circle with a number one inside of it.

The current view of the car 940*a* includes the selectable tag 946. As described above, the MVIDMR can include a plurality of different views of the object, which, in this example, is the car. In each frame with a different view, the location on the object can appear in different locations in the frame because the view has changed. Thus, the system can be configured to determine where the location on the object appears in the remaining frames of the MVIDMR including whether the location object appears in the frame at all.

The selectable tag, such as 946, can be rendered in the frames where the location on the object appears in each frame. Thus, first plurality of frames for the MVIDMR of the object can be modified to form a second plurality of frames including the selectable tag rendered into all or a portion of the frames. An MVIDMR modified in this manner can be referred to as a tagged MVIDMR.

In screen shot 900*o*, the interface can be configured to allow the tagged MVIDMR to be previewed. In the preview, the locations where the selectable tag appears in each frame can be viewed. In some instances, as the location on the object comes into view and goes out of view, the selectable tag may appear and disappear on the selectable MVIDMR.

As examples, screen shot 900*p* shows a second view 940*b* of the car. The selectable tag 946 appears at a different location in the frame as compared to the frame in screen shot 900*o*. In screen shot 900*q*, the location where the selectable tag is placed on the object can be determined to no longer appear in the current view of the car 940*c*. Thus, the selectable tag is not rendered in this frame of the tagged MVIDMR.

In addition in screen shot 900*p*, the selectable tag appears at a slightly different location on the car as compared to screen shot 900*o*. In particular, the location on the object where the selectable tag is rendered in screen shot 900*p* is shifted to the left as compared to the location on the object where the selectable tag is rendered in screen shot in 900*o*. The key point tracking of the location on the object from frame to frame may not be exact. As described above, key points can be tracked from frame to frame using techniques such as optical flow calculations to match a key point appearing in a first frame to a second frame. Factors, such as lighting conditions, can affect the tracking. Hence, key points may not be tracked exactly from frame to frame and the placement location on the object can vary from frame to frame.

In one embodiment, the interface can allow the placement of a selectable tag within a frame to be manually adjusted. For example, the location of selectable tag 946 can be manually shifted to the right to more closely match the location on the object of the selectable tag 946 in 900*o*. In one embodiment, the newly selected location for the selectable tag can be limited to the current frame on which the adjustment was made, i.e., only the current frame is modified with the newly selected location of the selectable tag 946. In another embodiment, the newly selected location can be used with the originally selected location, as an additional data point, to determine the locations of the selectable tag in the remaining frames.

From screen shots 900*o*, 900*p* or 900*q*, using prompt 942, the tagged MVIDMR can be saved and as described as follows, additional selectable tags can be added. Alternatively, using prompt 944, the tag placement can be changed. For example, the selector 936 with cross 934 can be rendered again on the screen as shown in 900*n* and then, a new location on the object can be selected for placing the selectable tag. Then, the system can determine where the new location appears in each of the remaining frames of the MVIDMR and can render a selectable tag at the determined locations. Then, screen 900*o* with the selectable tag at the new location can be regenerated and the tagged MVIDMR with the selectable tag at the new location can be previewed.

In the example of 900*o*, the selectable tag 946*a* is rendered as a 2-D flat circle with a number on it. As described below, the selectable tag can be labeled in some manner, such as with a textual description. In addition, the size and shape of the selectable tag can be varied. For example, a square or rectangular tag can be used and the size can be larger or smaller than the size shown in 900*o*.

In a particular embodiment, the selectable tag can be rendered from a 3-D object which is projected into the 2-D frames of the MVIDMR. Thus, the selectable tag can appear to extend from the object. For example, a selectable tag can be rendered from a hemisphere or a 3-D model of a pushpin. The 3-D model can include a texture, such as a label painted onto the 3-D surface. In one embodiment, the view of the 3-D model can change as the view of the object changes in the tagged MVIDMR. For example, the 3-D model of the pushpin used as a selectable tag can be rendered so it appears from different angles as the current view of the car changes.

As described above and with more detail below, the selectable tag, such as 946, can be selected to cause media content associated with the selectable tag to be output to the display. Thus, the size and shape of the selectable tag can be associated with a pixel area for each frame. The pixel area's location can vary from frame to frame because the determined location on the object can vary from frame to frame.

A determination that a selection has occurred within the pixel area associated the selectable tag can cause an action, such as but not limited to an output of media output. The selection can occur via various input methods, such as detecting a touch from a touch screen sensor or via cursor and a mouse. Thus, one aspect of generating the tagged MVIDMR can be determining, for each frame in which a selectable tag appears, a pixel area in the frame that is to be associated with a selection of the selectable tag.

In 900*r*, after the "save tag placement" prompt 942 has been selected, the interface can enter into a state where media content associated with selectable tag, such as 946. In one embodiment, the interface can be configured to offer the user to select from different types of media content to associate with the selectable tag, such as taking a photo, generating a new MVIDMR, uploading an existing MVIDMR, uploading a media file (e.g., audio, video, text or combinations thereof), entering text, etc. In 900*r*, a selection of "photo," as indicated by the label 948. Using a camera coupled to the interface, the capture photo 950 prompt can be selected to capture a photo that is to be associated with the selectable tag, such as a close up view of the location where the selectable tag was placed.

The close up view can be used to reveal detail of a feature of interest on the object. For example, in 900*r*, the detail can be of the front grill design on the car. In another, the front grill can be damaged in some manner. Thus, the close up view linked to the selectable tag can allow the damage to be more closely inspected when the selectable tag is selected.

Screen shots 900*s* and 900*t* illustrate interface states where information about a selectable tag can be modified. For example, the label 952 for selectable tag 946 is called "detail tag." After selecting the prompt change label 958 in 900*s*, using the keyboard interface 962, in 900*t*, the label 952 can be renamed as "front." In addition, in 900*s*, the prompts 954, 956 and 960 can be used to delete, move or save the selectable tag including modifications to its label.

In 900*u*, the interface is shown in a state that enables a second selectable tag to be added to the tagged MVIDMR including the first selectable tag. In 900*u*, the car is shown in a view 940*d* from the side. The selector 936 is positioned with the cross over the center of the wheel of the car. Then, the place tag prompt 938 can be selected to add the second selectable tag.

In 900*v*, the second selectable tag 966 has been rendered into the current frame. Thus, a view of the car 964*a* including the second selectable tag 966 is shown. In this view, the first selectable tag, described above, is not visible. After placing the second selectable tag, a newly tagged MVIDMR with the first selectable tag and the second selectable tag can be viewed. In 900*w*, a second view 964*b* of the car is shown. In this view, the first selectable tag 946 is visible and the second selectable tag is not visible.

In general, a tagged MVIDMR of an object can include a plurality of selectable tags. In some instances, on some frames, none of the plurality of selectable tags can be visible. In other instances, all of the plurality selectable tags can be visible on some frames. In yet other instances, different combinations of the plurality of selectable tags can be visible depending on the frame. For example, for a tagged MVIDMR with two selectable tags, some frames can show both selectable tags, some frames can show only the first selectable tag, some frames can show only the second selectable tag and some frames may not show either the first selectable tag or the second selectable tag. These combinations can vary from MVIDMR to MVIDMR depending on the angular view captured of the object and the selected locations on the object where the tags are placed.

In 900*x*, an interface state is described where the second selectable tag can be modified. In 900*x*, the second selectable tag is referred to as a detail tag 968. As described above, via the change label prompt, the label of the second selectable tag can be changed, such as from "detail tag" to "back wheel." In addition, the second selectable tag can be moved, deleted or saved from this interface state.

Next, the second selectable tag can be saved which causes interface state 900*y* to be generated. In 900*y*, a selection between an MVIDMR 970 or a photo 972 can be made as media content to associate with the second selectable tag. In this example, the MVIDMR 970 is selected. The capture MVIDMR prompt 974 can be selected to begin recording of video data for the MVIDMR, such as a detail of the wheel.

In 900*z*, live video recording for the MVIDMR is initiated. The record and stop prompt 974 can be used to begin or stop the recording of video data for the MVIDMR. In 900*aa*, the message "capture complete" 978 is output to indicate the MVIDMR associated with the second selectable tag has been captured. From this interface state, the second selectable tag 966 can be selected and the media content associated with the second selectable tag, which is an MVIDMR with close-up views of the wheel, can be output.

Further, the interface state allows the current tagged MVIDMR having the first selectable tag and the second selectable tag to be viewed. In 900*aa*, the view 946*c* of the car in the MVIDMR is shown. Input can be provided which causes the MVIDMR of the car to rotate, as indicated by the arrows. When the first selectable tag comes into view, the first selectable tag can be selected and the media content associated with the first selectable tag, which is a photo of the front of the vehicle, can be output. The first selectable tag can appear in a portion of the frames of the MVIDMR and a selection can be made from any one of these frames. Finally, the interface allows an additional tag to be added to the current tagged MVIDMR or the current tagged MVIDMR with two selectable tags to be saved and published, such as uploaded to web-site.

In particular embodiments, details of a tagging session can be saved used as a starting point for a subsequent tagging session. As described above, a first tagging session involving the placement of two tags was described. Later, a second tagging session can be invoked which starts from the first tagging session where additional selectable tags can be added.

For example, a first tagging session can involve a rental car. In the first tagging session, an MVIDMR of the rental car can be generated and a damage location on the rental car can be tagged. Later, in a subsequent tagging session after a second damage location has occurred, the first tagging session can be invoked as a starting point to add a second selectable tag at the new damage location using the original MVIDMR of the object from the first tagging session.

In another example, a first MVIDMR (or photo or video stream) of an object can be tagged in a session with one or more selectable tags. Then, a new tagging session involving the object can be instantiated. In the new tagging session, a second photo, video stream or MVIDMR of the object can be generated. The second MVIDMR (or photo or video stream) of the object may be generated to reflect a new state of the object which may have changed over time.

In one embodiment, the system can be configured to map locations on the object with tags in the first MVIDMR to locations on the object in the second MVIDMR. For example, when the object is a car and a location on the wheel of the car is tagged in the first MVIDMR, the system can be configured to determine where the location on the wheel of the car occurs in second MVIDMR and propagate the tag to the second MVIDMR. Then, additional tags can be added to the second MVIDMR. Thus, the user doesn't have to start the tagging process from scratch if the user decides to replace the first MVIDMR with a second MVIDMR of the object.

In another embodiment, the system can be configured to provide an interface where two or more tagged MVIDMRs can be compared with one another. For example, two tagged MVIDMRs of the two different objects, such as two cars can be compared with one another. In another example, two tagged MVIDMR of the same object, such as from different tagging sessions, can be compared to one another.

In one embodiment, the two tagged MVIDMRs can be overlaid on top of one another. For example, one of the objects can be made transparent so they are both visible. In another embodiment, the two tagged MVIDMRs can be displayed in a side by side manner.

In one embodiment, the system can be configured to align the views of the objects in the two tagged MVIDMRs. For example, when the objects are two cars, the system can be configured to detect and align the side views of a first car and a side view of the second car (whether overlaid with one another or side by side). In some instances, the system can be configured to rotate both the objects in unison based upon a single input. For example, the system can receive a navigational input for a first tagged MVIDMR and then rotate both the first tagged MVIDMR and a second tagged MVIDMR such that both the same view of each object are approximately displayed.

In another embodiment, the system can be configured to allow the two or more tagged MVIDMRs to be independently rotated. However, the system can include a button which returns to the two or more tagged MVIDMRs to a common view. In one instance, the system can be configured to receive a viewing angle, such as a number, or a descriptor, such as "front," "side" or "rear" and then set two or more tagged MVIDMRs to the view associated with the viewing angle or the descriptor.

In a particular embodiment, two similar objects, such as two cars, can be tagged in a similar way or have a number of selectable tags in common. In this instance, when the two objects are compared and a first selectable tag on the first tagged MVIDMR is selected, the system can be configured to determine whether the second tagged MVIDMR includes a similar selectable tag, such as in a common location. Then, the system can output the media content associated with the selectable tags in the common locations in a side by side or overlaid manner for comparison purposes. This approach can be repeated when more than two tagged MVIDMRs are compared.

For example, two tagged MVIDMRs of cars can each include a selectable tag showing details of the dashboard. When a first selectable tag on a first MVIDMR of the car is selected via an input, the system can locate first media content associated with the first selectable tag on the first car and second media content associated with a second selectable tag on a second car. Then, the first media content and the second media content can be shown together for comparison purposes.

When a photo, a stream of video images or an MVIDMR of an object is tagged over time, the system can be configured to store time data associated with each selectable tag added to the object. For example, image data including a rental car is tagged over time, and then time data can be stored for each selectable tag to indicate when the selectable tag was added, such as date and time. Additional descriptive information can also be associated with the selectable tag, such as a mileage on the car when the selectable tag was added. Also, if the car were involved in an incident where damage occurred, additional descriptive detail about the incident can be associated with the selectable tag.

In some instances, a location on an object can be tagged and then the details of the location can be updated over time. Then, the multiple details of the location can be accessed via the selectable tag. For example, on a car, a first selectable tag can be placed on a mirror and additional media content showing details of the mirror can be captured when the car is new. Subsequently, the car mirror can be damaged and new media content can be captured showing the damage to the mirror to associate with the selectable tag at the mirror location. Then, when the selectable tag is selected, the system can show one of the media content in the original state (prior to the damage), the media content in the damaged state or both the media content from both states, side by side. In general, media content associated with a plurality of states in time can be associated with a selectable tag.

As another example, a plan view of a person or an MVIDMR of a person can have a selectable tag associated with a wound, such as a burn or stitches. Media content associated with a detail of the wound such as a close up view of the wound can be recorded at different moments in time. Then, when the selectable tag is selected, the close up views from different times can be output. Thus, a doctor can view the progress of the healing at the wound site over time.

In one embodiment, when multiple instances of media content are associated with a location, multiple selectable tags can be placed at the location. For instance, a first selectable tag can be placed at the location associated with a first time and a second selectable tag can be placed at the location associated with a second time. The first selectable tag and the second selectable tag can be off-set so that both are visible. In another embodiment, a single selectable tag can be provided that indicates multiple instances of media content are available at the location. For instance, the single selectable tag associated with multiple instances of media content can be colored or shaped differently than a selectable tag associated with only a single instance of media content.

In a particular embodiment, the system can include filters which allow selectable tags which have been added as a function of time to be selected. For example, a first filter can include all selectable tags. A second filter can allow a user to select selectable tags added within a specific time period. Then, the system can output to the display a tagged photo, video stream or an MVIDMR with the selectable tags added within the selected time period.

Next, session tagging is described where a selectable tag can lead to a different portion of an object, such as an interior of an object. In 900*bb*, an option is provided to add a selectable tag associated with the interior of the object. In one embodiment, the selectable tag associated with the interior of the object can appear in all of the plurality of frames associated with the current tagged MVIDMR. In this example, the current tagged MVIDMR includes two selectable tags. Thus, when the interior selectable tag is added, the total number of selectable tags associated with the current tagged MVIDMR can be increased to three selectable tags.

After it is added, a selection of the interior selectable tag can cause media content associated with the interior to be output. In one embodiment, the media content can be an MVIDMR showing an interior of the object, which is the car. In a particular embodiment, the media content can be a tagged MVIDMR of the interior of the object including one or more additional selectable tags. The additional selectable tags can be separate from the selectable tags associated with the exterior of the object.

For example, the tagged MVIDMR of the interior of the car can include one or more selectable tags which cause media content associated with details of the interior to be output. Further, the tagged MVIDMR of the interior can include an exterior selectable tag which, when selected, causes the tagged MVIDMR of the exterior of the object to be output, i.e., to switch between the interior and the exterior. In another embodiment, a prompt can be provided on the interface, which causes the interface to switch between the tagged MVIDMR (or non-tagged) of the interior of the object and the tagged (or non-tagged) MVIDMR of the exterior of the object.

In general, a tagged MVIDMR of an object can be nested with one or more tagged MVIDMRs. For example, a first tagged MVIDMR can include a first selectable tag that when selected causes a second tagged MVIDMR to be output. The second tagged MVIDMR can include a first selectable tag that when output causes a third tagged MVIDMR to be output. Further, the second tagged MVIDMR can have a second selectable tag which causes the first tagged MVIDMR to be output, i.e., to switch between the first tagged MVIDMR and the second tagged MVIDMR.

As an example, a first tagged MVIDMR of the exterior of the car can have a first selectable tag, which causes a second tagged MVIDMR of the interior of the car to be output. The second tagged MVIDMR can have a first selectable tag which causes third tagged MVIDMR of the dashboard of the car to be output. The third tagged MVIDMR of the dashboard can have a plurality of tags that when selected causes media content associated with different features of the dashboard to be output.

Returning to FIG. 9J, after the "add interior" prompt 980 is selected, in 900*cc*, the interface enters into a state where a plurality of frames used to generate an MVIDMR of the interior of the car can be captured. In 900*cc*, the prompt "capture interior MVIDMR" 982 and a frame 984 are rendered into the images being received from the camera. The frame 984 can help the user keep the content centered in the images captured for the MVIDMR of the interior of the object.

In 900*cc*, the record/stop prompt 988 can start and stop the capture of images used to generate the MVIDMR of the interior of the car. The indicator 986 can indicate what angular view of the interior has been captured so far. Initially, the indicator starts at a count of zero degrees.

In one embodiment, the interface can be configured to output prompts to capture media content for certain features associated with the MVIDMR and add a selectable tag at a location associated with the feature. In 900*dd*, the prompt 990 "capture front seat" and instruction 992 to capture a photo of the front seat is displayed. In response, a photo can be recorded. The photo can be associated with a selectable tag.

In 900*ee*, a prompt 994 "place front seat tag" is output. The selector 936 can be used to position a selectable tag associated with the front seat. The interface can be configured to receive input, such as touch screen or cursor input, which allows a position of the selector to be adjusted relative to the underlying image. In 996, the "add tag" prompt 996 can be selected to place a selectable tag at the current location of the selector 936.

In general, the interface can be configured to output one or more locations where a user is to place a selectable tag and then associated additional media content with the selectable tag. In one embodiment, the interface and system can be configured to identify a location on an object and then provide indicators, such as arrows or a path to the location rendered into the live video stream so that the user can guided to a location where to place a selectable tag (or the system can perform this task automatically) and/or capture additional media content associated with the location.

For example, on a car, the system can be configured to prompt the user to place a tag on one of the wheels. The system can identify a location on the wheel, such as the center of the wheel. Then, the system can render over the live video stream a guide, which can be a curve of some type, for the camera to follow to reach the location or an indicator where the location on the wheel is to be tagged, such as an arrow rendered into the image.

This process can be repeated for a number of locations on an object. For example, from the wheel on the car, the system can prompt the user to tag and capture media content on a side view mirror. If the system can identify the side view mirror in the image, then a guide from the wheel to the side view mirror can be rendered into the image or indicators can be rendered into the image showing the location of the side view mirror. When the system determines a 2-D or a 3-D structure for an object, then the guide can indicate a location which may be occluded in the image. For example, the guide can curve around the car to direct the user to a location on an opposite side of the car that is occluded in a current view of the car.

In other embodiments, after the system has prompted a user to place selectable tags and/or capture media content at specific locations on an object and has received media content for each selectable tag, the system can implement a review process in the interface. In the review process, the system can output locations that were requested to place a tag, the location where the selectable tag was actually placed for the requested location and the media content associated with the requested location. Then, the system can ask for the user to confirm that the selectable tag is in the correct requested location and the media content that has been associated with the requested location is correct. If either is not correct, then the system can allow the user to reposition the tag and/or record new media content.

In one embodiment, when system has identified a location on an object and placed a selectable tag at a location, the system can be configured to allow a user to manually determine if the location has been correctly identified. When the user determines the system has not correctly identified the location, the system can allow the user to manually adjust the location of selectable tag determined by the system. Then, the new position of the selectable tag, manually adjusted by the user, can be propagated into the remaining frames.

In one embodiment, the system can provide guides and/or indicators as to locations where tags have been placed on an object. For example, the guides can be used in the review process described above to guide a user to the locations where selectable tags have been placed. In some embodiments, the guides can be based upon one or more filters input into the system. For example, an object can be tagged at a plurality of locations to indicate damage as well as other features. A filter can be provided that allows a user to view only tag locations associated with damage. Then, the system can locate one or more images where the selectable tags appear and then one or more guides or indicators can be provided which direct the user to selectable tags associated with damage locations. Again, the guides can be curves and/or indicators, such as arrows.

Returning to FIG. 9K, in 900*ff*, a selectable tag 1002 is placed within the MVIDMR of the interior of the object. The MVIDMR of the interior object can be viewed to see which locations the selectable tag 1002 appears in each of the plurality of frames of the interior of the MVIDMR. As described above, the selectable tag 1002 may only appear in a portion of the frames depending on whether the location associated with the selectable tag on the object is in view or not in view.

In various embodiments, an object can include multiple interior locations. For example, the car can include the passenger compartment, trunk compartment and engine compartment. A tagged MVIDMR can be generated for each interior compartment. A different selectable tag can be placed on the tagged MVIDMR of the exterior of the object that when selected causes the tagged MVIDMR (or non-tagged) associated with each interior compartment to be output to the display.

For example, a first selectable tag can be placed above the trunk which causes an MVIDMR of the trunk to be output. A second selectable tag can be placed above the passenger compartment which causes an MVIDMR of the passenger compartment to be output. Finally, a third selectable tag can be placed above the hood, which causes an MVIDMR of the engine compartment to be output.

The "change tag placement" prompt 998 can cause the interface to enter a state where the location of the selectable tag 1002 can be changed. As described above, each time the location where a selectable tag is changed, the locations where the selectable tag appears in the remaining frames can be changed. When the "save tag placement" prompt 1000 is selected, the location of the selectable tag 1002 can be saved in the current frame and at the determined locations in the remaining frames of the MVIDMR.

As described above in screen shot 900*s*, the interface can be configured to allow the user to change details of the selectable tag, such as a label. In addition, the interface can be configured to allow a user to place additional selectable tags at different interior locations. Also, the interface can allow a user to capture and/or associate media content with each selectable tag.

In 900*gg*, the capture of the tagged MVIDMR of the interior of the car is complete and the interface is in a state where the tagged MVIDMR of the exterior of the car is shown. A first view 1004 of the car in the current tagged MVIDMR is shown. The first view 1004 includes the second electable tag 966 associated with the wheel and the selectable tag 1008 associated with the interior of the car. In 900*gg*, the interface can allow the plurality of frames associated with the current tagged MVIDMR of the exterior of the MVIDMR to be viewed.

When the selectable tag 1008 associated with the interior is selected, the interface can output the current tagged MVIDMR associated with the interior of the car. Then, the interface can allow the plurality of frames with the current tagged MVIDMR of the interior of the MVIDMR to be viewed. In 900*gg*, when either the current tagged MVIDMR associated with the exterior or the interior is shown, the interface can be configured to allow additional selectable tags to be added. Alternatively, the interface can be configured to allow the current MVIDMR of the interior and the exterior to be published.

In one embodiment, the system can be configured to receive media content associated with a detail of an object, such as a photo, video stream or MVIDMR, showing details of a location on the object and then determine where the location appears in one or more images showing a less detailed view of the object. For example, the system can receive media content, such as a photo, a video recording or an MVIDMR, showing detail of a location on a car, such as a wheel. Then, the system can determine where the location appears on a photo, video recording (series of images) or an MVIDMR which includes a less detailed and larger view of the object including the location with the detail, place a selectable tag at the location and then associate media content with the selectable tag. Thus, in this example, rather than starting with a large view of the object, selecting tag locations and then associating media contents with the tag locations that provides more detail, the associated media content associated with details of a location on an object can be used to determine where to place a selectable tag on a larger view of the object.

This process can involve matching a detail of an object on a first image to a larger view of the object in a second image. For example, if a first image of an eye and surrounding detail of the eye on the face and a second image showing the whole face were provided. The system can be configured to determine how the first and second images overlap, i.e., the mapping of the eye in the first image to the eye region in the second image of the face. Then, a selectable tag can be placed near the eye region in the second image of the faces. If a series of images of the face are provided, such as in an MVIDMR, then the system can propagate the selectable tag locations to the remaining frames in manners described above.

In one embodiment, to tag an object, a photo can be taken of an object, such as a detail of an object. The detail can be used as media content for a selectable tag. The center of the photo can be used as the selectable tag location. Then, the location associated with the center of the photo can be matched to a location on an image showing a larger view of the object, such as in an image from an MVIDMR of the object. A selectable tag can then be placed at this location in the image from the MVIDMR and propagated to the remaining images in the MVIDMR.

The approach in the previous paragraph can be used to only tag the MVIDMR without using the photo as the media content for the selectable tag. For example, after a photo is taken of the detail and then the center of the photo is used as determine a tag location on an MVIDMR, media content for the selectable tag can be recorded. For example, a video recording can be captured of the detail or an MVIDMR can be generated of the detail. Then, the video recording or the MVIDMR can be associated with the selectable tag.

Figure 10A:
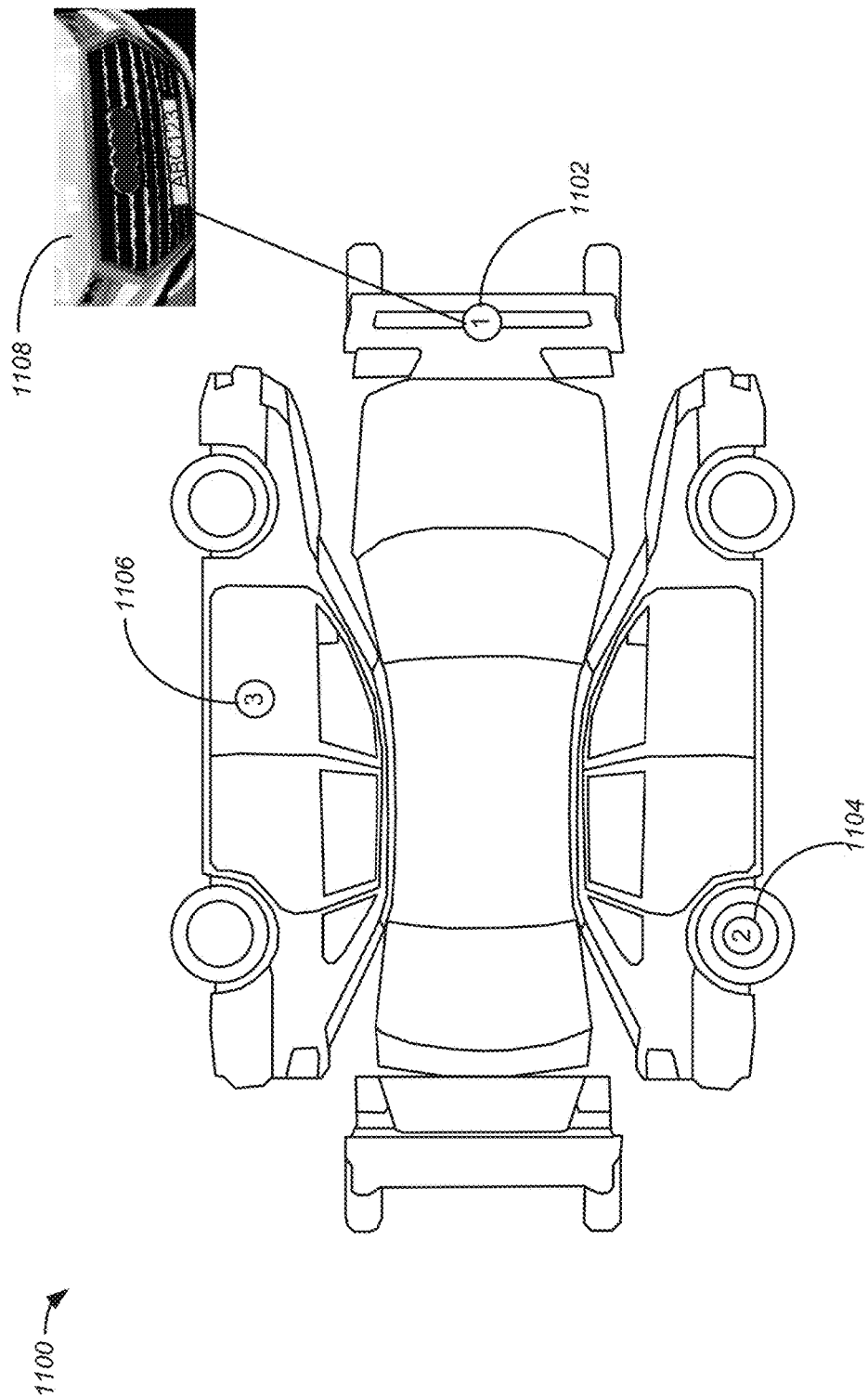
FIG. 10A illustrates an example of projecting tags placed in an MVIDMR of an object into a plan view of an object in accordance with embodiments of the present invention.
Figure 10B:
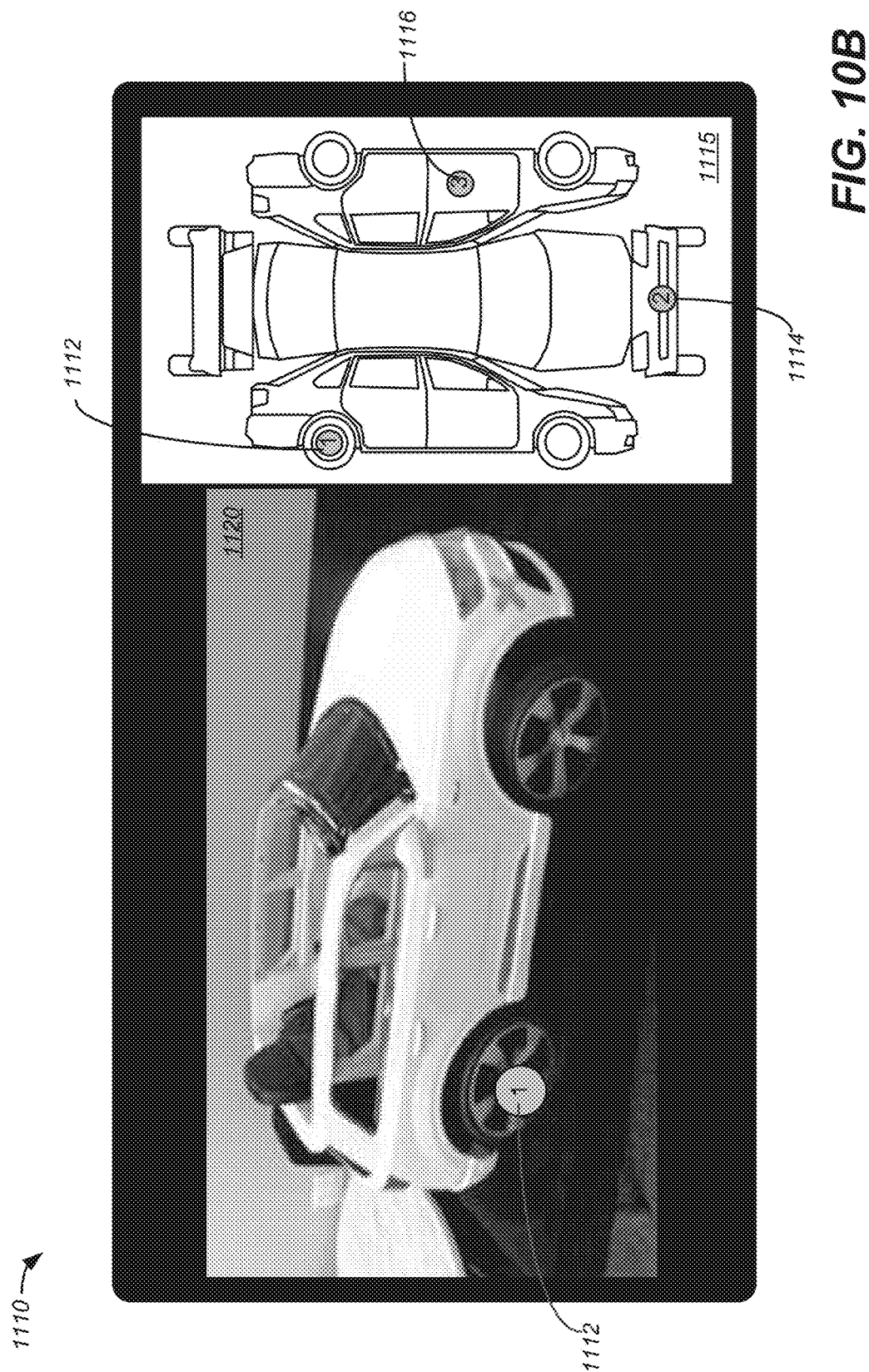
FIG. 10B illustrates an example of navigating through an MVIDMR of an object using a plan view of the object in accordance with embodiments of the present invention.

Next, alternate configurations for presenting selectable tags are discussed with respect to FIGS. 10A and 10B. In one embodiment, a 2-D plan view of a 3-D object can be generated and then the tag can be placed on the plan view of the object. The 2-D plan view can be associated with an MVIDMR of the object.

FIG. 10A illustrates an example of projecting tags placed in an MVIDMR of an object into a plan view of an object. In this example, a plan view of a car showing the top, back, front and sides, simultaneously, is shown. The bottom of the car can also be included.

Three tags, 1102, 1104 and 1106, are shown in the image. The first tag 1102 is associated with the front grill of the car. The second tag 1104 is associated with the wheel. The third tag 1106 is associated with a location on the door of the car.

In one embodiment, the tags, 1102, 1104 and 1106, can be selectable. Hence, when each tag is selected, media content associated with each tag can be output to the display. For example, when tag 1102 is selected, the media content, which is a front view of the car, can be output to the display. In another embodiment, the tags, 1102, 1104 and 1106, can be non-selectable. In this example, the plan view placement of the tags can provide a guide as to where the selectable tags are located on the MVIDMR of the car.

In yet other embodiments, the system can be configured to map between the plan view of the object and the MVIDMR of the object and vice versa. The map can be used to place selectable tags on the object in the MVIDMR or place tags (selectable or non-selectable) on the plan view. For example, when a selectable tag is placed on the MVIDMR of the object, the map can be used to determine a location on the plan view of the object to place the selectable tag. As another example, when a tag (selectable or non-selectable) is placed on the plan view of the object, the location on the plan view of the object and the map can be used to determine locations in each of the plurality of frames of the MVIDMR of the object to render the tag.

In another embodiment, the plan view can be used to indicate requested locations to place selectable tags on an MVIDMR of an object. All or a portion of the requested locations can be selected. In addition, custom selectable tags can be added to the plan view. Then, the system can manually prompt the user to place selectable tags at the selected requested locations including any custom selectable and record media content for the selected locations.

In particular embodiments, a plan view of an object can be provided, such as a plan view of the car. In other embodiments, the system can be configured to generate a plan view of an object, such as from an MVIDMR of the object. For example, based upon the image data in an MVIDMR of an object, the system can be configured to construct a 3-D structure for the object. The 3-D structure can involve identifying particular locations on the object which are connected in a known manner. For example, on a person, it is known that the elbow connects to the wrist and the shoulder. Then, the 3-D structure can be projected to a 2-D surface to provide a plan view of the object.

The plan view is one example something other than an MVIDMR can be tagged. In other examples, a single image of an object, such as a frame from a video stream can be tagged. In another example, a video stream, such as a live video stream recorded of an object, can be tagged. The video stream may not have been converted to an MVIDMR.

FIG. 10B illustrates an example of an interface state 1110 where a plan view 1115 of the object can be used to navigate through an MVIDMR of the object. In the plan view 1115, three selectable tags, 1112, 1114 and 1116 are shown. When one of the selectable tags is selected, one or more frames from the MVIDMR of the object which include the selectable can be output. For example, when selectable tag 1112 is selected in plan view 1115, a frame 1120 from the MVIDMR including the selectable tag 1112 can be output.

In one embodiment, when a selectable tag in the plan view of the object, such as 1115, is displayed, a single frame of the tagged MVIDMR including the selectable tag can be output. Then, the interface can be configured to allow a user to navigate through the MVIDMR from this location. In another embodiment, a plurality of frames including the selectable tag, including all the frames with the selectable tag, can be output.

In FIGS. 9A-10B, the system features are primarily described using a car as an example of object. The system is not limited to cars. In another example, a tagged object can be a piece of clothing. The selectable tags can be associated with details of the clothing, such as stitching, zippers, buttons, etc. For example, a photo, video stream of a wedding dress can be tagged. Then, the selectable tags can be associated with media content associated with detail of the wedding dress, such as bead work or lace work.

In another example, the object can be an appliance, such as a refrigerator, stove, a washer, a dryer or a microwave. When the object has an interior and exterior, MVIDMRs can be generated of the interior and exterior. Then, the interior and exterior MVIDMRs of the object can be tagged. Each tag can be associated with media content showing details of the object. For example, on a stove, the burners and the control nobs can be tagged. Then, media content showing close up views of the burners and control nobs can be associated with the selected tags.

In yet another example, the object can be a house or a building. In this example, the image data can be recorded using a camera on a drone (image data can also be recorded from a hand held device). The drone footage can be used to generate an MVIDMR of the exterior of the house which can be subsequently tagged. In one embodiment, a plan view of the house can be associated with the interior of the house. Further, a plan view can be used with an exterior of the house and the surrounding property. In particular embodiments, the system can be configured to construct plan views of the exterior and/or interior of an object, such as a house, based upon captured image data associated with the object.

In one embodiment, the system can be configured to allow a user to select tag locations on an exterior of the house and the surrounding property, such as within a plan view. Then, the system can be configured to guide a drone to automatically capture images associated with the selected tag locations. The images can be converted into an MVIDMR. The captured images can be used as media content which is associated with the selectable tag. For example, the drone can be used to capture images of a back patio on a house or a garden adjacent to the house. Further, a drone can be guided through the house to capture image data associated with the interior of the house.

Figure 11:
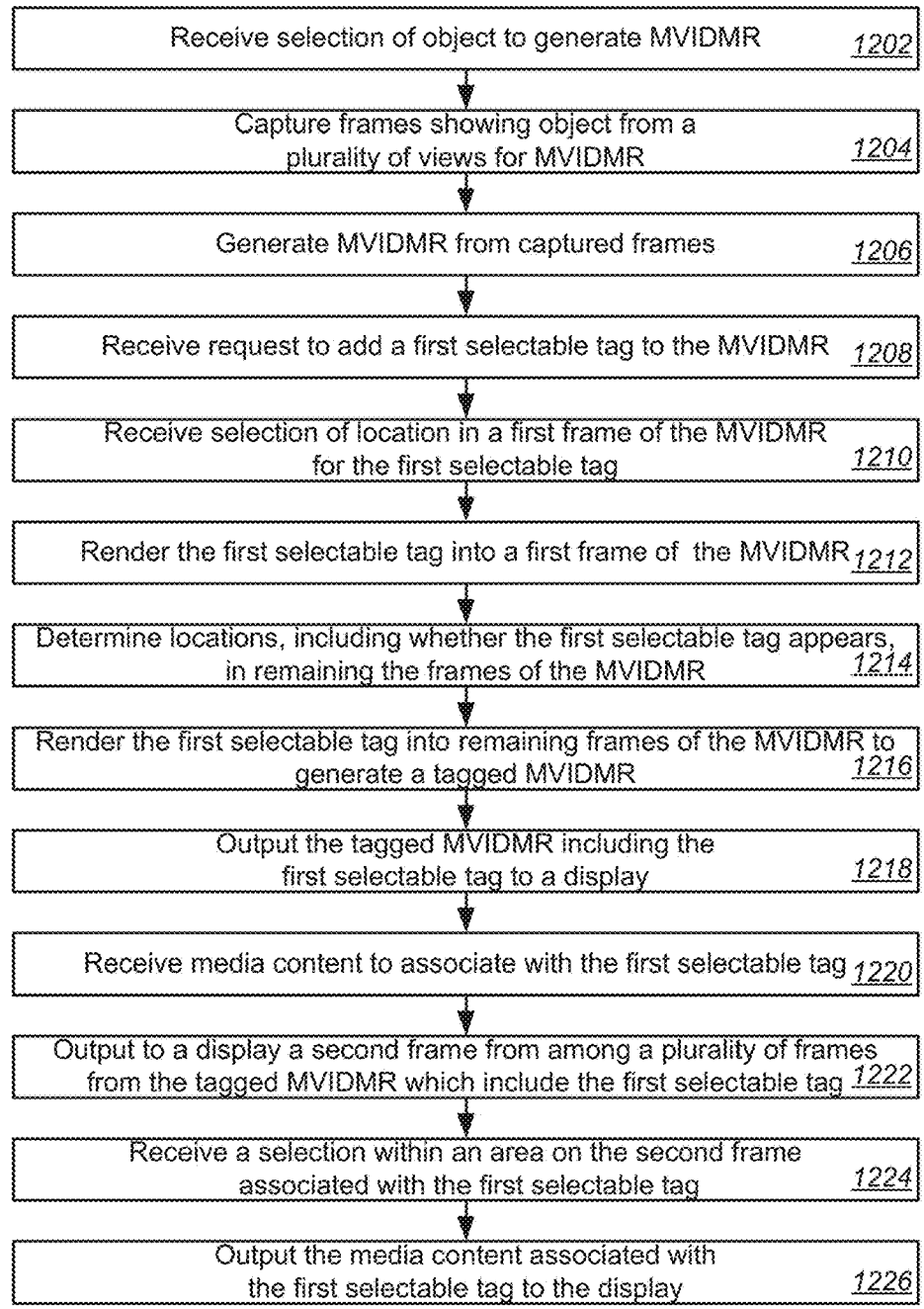
FIG. 11 illustrates a method of generating an MVIDMR of object with tagged locations in accordance with embodiments of the present invention.

FIG. 11 illustrates a method 1200 of generating an MVIDMR of object with tagged locations. In 1202, a selection of an object to generate MVIDMR can be received. Frames showing the object from a plurality of views can be captured from a live video stream. The object can be an exterior or an interior of the object. In 1206, an MVIDMR of the object can be generated from the captured frames. The MVIDMR of the object including a plurality of frames can be output to the display.

In 1208, a request can be received to add a first tag to the MVIDMR. In alternate embodiments, an image frame of an object or a series of images including an object, such as images from a video recording, can be tagged. Hence, the method is not limited to tagging an MVIDMR. In 1210, a selection of a location in a first frame of the MVIDMR can be received for a first selectable tag. In 1212, the first selectable tag can be rendered into the first frame of the MVIDMR at the selected location.

In 1214, the locations where the first selectable tag appears in the remaining frames of the MVIDMR can be determined. In some instances, the first selectable tag may not appear in a portion of the remaining frames. In 1216, the first selectable tag can be rendered into the remaining frames of the MVIDMR at the locations where it is determined to appear to generate a tagged MVIDMR. In 1218, the plurality of frames of the tagged MVIDMR of the object including the frames where the first selectable tag appears can be output.

In 1220, media content to associate with the first selectable tag can be received. The media content can be an MVIDMR without selectable tags, an MVIDMR with selectable tags, a photo, an audio clip, a movie clip, a text source, such as a brochure, or combinations thereof. In 1222, a second frame from among the plurality of frames from the tagged MVIDMR which includes the first selectable tag can be output to the display. In 1224, a selection within an area on the second frame associated with the first selectable tag can be received. In 1226, in response, the media content associated with the first selectable tag can be output to the display.

Figure 12:
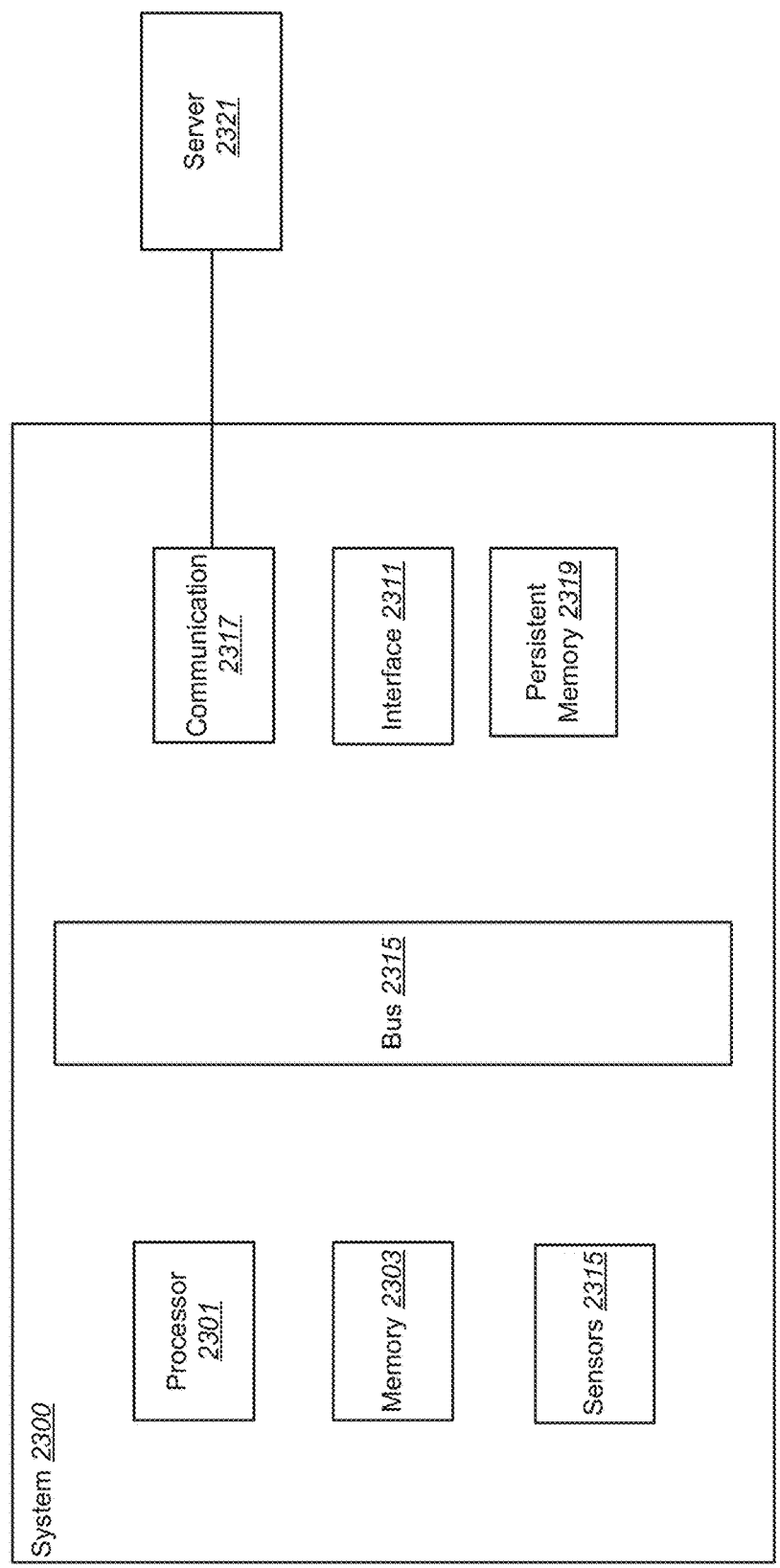
FIG. 12 illustrates a particular example of a computer system that can be used with various embodiments of the present invention.

With reference to FIG. 12, shown is a particular example of a computer system that can be used to implement particular examples of the present invention. For instance, the computer system 2300 can be used to provide multi-view interactive digital media representations according to various embodiments described above. According to particular example embodiments, a system 2300 suitable for implementing particular embodiments of the present invention includes a processor 2301, a memory 2303, an interface 2311, a bus 2315 (e.g., a PCI bus), a persistent memory 2319 and a server 2321.

In particular embodiments, the persistent memory 2319 can store data for subsequent off-line processing. In some embodiments, the off-line processing can be performed on system 2300. In alternate embodiments, a portion of the off-line processing can be handed off to a remote device, such as server 2321.

The system 2300 can include one or more sensors, such as light sensors, accelerometers, gyroscopes, multi-axis magnetometers, microphones, cameras including stereoscopic capabilities or structured light cameras. Structured light cameras can be used to determine distances from the camera to objects in images. A Kinect™ uses a structured light sensor. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In one embodiment, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

As described above, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data.

One advantage of tracking objects in the manner described above in the 2-D image space is that a 3-D reconstruction of an object or objects appearing in an image don't have to be performed. The 3-D reconstruction step can be referred to as "structure from motion (SFM)" in the computer vision community and "simultaneous localization and mapping (SLAM)" in the robotics community. The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

The interface 2311 may include separate input and output interfaces, or may be a unified interface supporting both operations. Examples of input and output interfaces can include displays, audio devices, cameras, touch screens, buttons and microphones When acting under the control of appropriate software or firmware, the processor 2301 is responsible for such tasks such as optimization. Various specially configured devices can also be used in place of a processor 2301 or in addition to processor 2301, such as graphical processor units (GPUs).

The touch screen can be a sensor which is placed over the display. The locations of touches received via the touch screen sensor can be mapped to content and their locations which are output to the display. Based upon the mapping, the mobile device can be configured to perform different actions depending on where the touch input is received on the touch screen sensor.

In one embodiment, the system 2300 can include dedicated hardware configured to implementing a neural net. For example, a special hardware chip, referred to as an NPU (Neural Processing Unit) can be employed. Neural nets can also be deployed on a GPU. Thus, it may be possible to implement plurality of neural nets in parallel. In one embodiment, the neural nets can be implemented to perform object recognition, segmentation (determining the boundaries or edges associated with objects or object parts) and/or skeleton detection in image data. In one embodiment, the neural nets for the skeleton detection and segmentation can be run in parallel. For example, the GPU can be utilized to execute a neural net which performs skeleton detection and the NPU can be used to execute a neural net which performs segmentation, such as body segmentation or vice versa.

The complete implementation can also be done in custom hardware. The interface 2311 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2300 uses memory 2303 to store data and program instructions and maintained a local side cache. The program instructions may control the operation of an operating system and/or one or more applications, for example. The memory or memories may also be configured to store received metadata and batch requested metadata.

In FIG. 12, the system 2300 can be integrated into a single device with a common housing. For example, system 2300 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 2300 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a multi-view interactive digital media representation. In addition, a virtual guide can be provided to help teach a user how to view a multi-view interactive digital media representation in the wearable system. For example, the virtual guide can be provided in synthetic images output to head mounted display which indicate that the multi-view interactive digital media representation can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
   on a mobile device including a processor, a memory, a camera, a plurality of sensors, a microphone and a display and a touch screen sensor, receiving via an input interface on the mobile device a request to generate a multi-view interactive digital media representation (MVIDMR) of an object;
   recording a first plurality of frames from the camera on the mobile device from a live video stream as the mobile device moves along a trajectory such that different views of the object are captured in the first plurality of frames;
   generating the MVIDMR of the object including a second plurality of frames from the first plurality of frames wherein the different views of the object are included in each of the second plurality of frames;
   outputting a first frame from the MVIDMR including a selector rendered over the first frame to the display;
   receiving, via the touch screen sensor and the selector, a selection of a location on the object in the first frame;
   removing the selector and rendering a first selectable tag at the location selected in the first frame;
   outputting the first frame including the first selectable tag to the display;
   for each remaining frame in the second plurality of frames of the MVIDMR, determining a first location where the location on the object appears in the each remaining frame including determining whether the location on the object appears in the each remaining frame;
   for each remaining frame where the location on the object appears, rendering the first selectable tag into each remaining frame at the first location to generate a third plurality of frames to form a tagged MVIDMR;
   outputting to the display the tagged MVIDMR;
   receiving media content associated with the first selectable tag;
   outputting a first frame from the third plurality of frames of the tagged MVIDMR that includes the first selectable tag;
   receiving input from the touch screen sensor indicating the first selectable tag is selected in the first frame from the tagged MVIDMR; and
   in response outputting the media content associated with the first selectable tag to the display.

2. The method of claim 1, further comprising outputting to the display the third plurality of frames associated with the tagged MVIDMR wherein the object appears in each of the third plurality of frames and wherein the first selectable tag appears in only portion of the third plurality of frames.

3. The method of claim 1, further comprising generating a prompt to save the tagged MVIDMR and in response to receiving a selection of the prompt saving the third plurality of frames associated with the tagged MVIDMR.

4. The method of claim 1, further comprising generating a prompt to move a current location of the first selectable tag, receiving an input to move the current location of the first selectable tag to a new location on the object, outputting a second frame including the first selectable tag at the new location on the object to the display, for each remaining frame in the second plurality of frames of the MVIDMR, determining a second location where the new location on the object appears in the each remaining frame including determining whether the new location on the object appears in the each remaining frame; and for each remaining frame where the new location on the object appears, rendering the first selectable tag into each remaining frame at the second location to generate a fourth plurality of frames for a second tagged MVIDMR.

5. The method of claim 1, based upon the first location where the first selectable tag is rendered in each of the third plurality of frames of the tagged MVIDMR where the first selectable tag appears and an area of the first selectable tag, determining a mapping between the first selectable tag and the touch screen sensor wherein the mapping is used to determine whether an input on the touch screen sensor indicates a selection of the first selectable tag.

6. The method of claim 1, further comprising outputting a first frame from the third plurality of frames of the tagged MVIDMR including the selector rendered over the first frame to the display;

receiving, via the touch screen sensor and the selector, a selection of a second location on the object in the first frame;

removing the selector and rendering a second selectable tag at the second location selected in the first frame of the tagged MVIDMR;

outputting the first frame including the second selectable tag from the tagged MVIDMR to the display;

for each remaining frame in the third plurality of frames of the tagged MVIDMR, determining a third location where the second location on the object appears in the each remaining frame including determining whether the second location on the object appears in the each remaining frame;

for each remaining frame where the second location on the object appears, rendering the second selectable tag into each remaining frame at the third location to generate a fourth plurality of frames for a second tagged MVIDMR; and outputting the second tagged MVIDMR, including the first selectable tag and the second selectable tag, to the display.

7. The method of claim 6, wherein the first selectable tag and the second selectable tag both appear in a portion of the fourth plurality of frames of the second tagged MVIDMR.

8. The method of claim 6, wherein only the first selectable tag appears in a first portion of the fourth plurality of frames of the second tagged MVIDMR and only the second selectable tag appears in a second portion of the fourth plurality of frames of the second tagged MVIDMR.

9. The method of claim 6, wherein neither the first selectable tag nor the second selectable tag appear in a portion of the fourth plurality of frames of the second tagged MVIDMR.

10. The method of claim 6, further comprising receiving second media content associated with the second selectable tag;

outputting a first frame from the fourth plurality of frames of the second tagged MVIDMR that includes the second selectable tag;

receiving input from the touch screen sensor indicating the second selectable tag is selected in the first frame; and in response, outputting the second media content associated with the second selectable tag to the display.

11. The method of claim 1, wherein the media content shows one or more close-up views of the location on the object.

12. The method of claim 1, wherein the media content is one of a photo showing a close-up view of the location on the object or a second MVIDMR showing close-up views of the location on the object.

13. The method of claim 1, further comprising, generating a prompt to capture the media content associated with the first selectable tag.

14. The method of claim 1, wherein the object is a car.

15. The method of claim 14, wherein the first selectable tag is associated with a damaged location on the car and wherein the media content shows one or more close-up views of the damaged location.

16. The method of claim 14, wherein the first selectable tag is associated with a component or a region of the car and wherein the media content shows one or more close-up views of the component or the region of the car.

17. The method of claim 1, wherein the object includes an exterior and an interior and wherein the tagged MVIDMR shows the exterior of the object further comprising generating a second tagged MVIDMR of the interior of the object, wherein the tagged MVIDMR of the exterior of the object includes a second selectable tag that when selected causes the second tagged MVIDMR of the interior of the object to be output to the display.

18. The method of claim 17, wherein the second tagged MVIDMR of the interior of the object includes a third selectable tag that when selected causes first media content showing one or more close up views of an interior location to be output to the display.

19. The method of claim 1, further comprising generating a plan view of the object, determining where the location on the object associated with the first selectable tag is located on the plan view, rendering a second selectable tag corresponding to the first selectable tag onto the plan view and outputting the plan view including the second selectable tag onto to the display.

20. The method of claim 19, further comprising: receiving a selection of the second selectable tag on the plan view, outputting to the display a second frame selected from among the third plurality of frames of the tagged MVIDMR which includes the first selectable tag.

21. The method of claim 19, further comprising: receiving a selection of the second selectable tag on the plan view and outputting to the display the media content associated with the first selectable tag.

22. The method of claim 1, wherein the location selected on the object is a component of the object, further comprising determining a plurality of key points associated with the component, tracking the key points in each of the remaining frames of the second plurality of frames to determine the first location in each of the remaining frames where the location on the object appears.

23. The method of claim 1, further comprising outputting to the display a textual description of the location on the object in the first frame that is to be selected and tagged.

24. The method of claim 1, further comprising, prior to recording first plurality of frames including the object, receiving an input indicating a selection of the object.

25. The method of claim 1, further comprising applying stabilization and smoothing to the first plurality of frames to generate the second plurality of frames.

* * * * *